US012709119B2

(12) United States Patent
Krier et al.

(10) Patent No.: US 12,709,119 B2
(45) Date of Patent: Aug. 18, 2026

(54) TIRE WITH ELECTRICALLY CONDUCTIVE PATHWAY

(71) Applicant: The Goodyear Tire & Rubber Company, Akron, OH (US)

(72) Inventors: Roland Willibrord Krier, Wasserbillig (LU); Daniel Hoffmann, St. Vith (BE); Carolin Anna Welter, Schleich (DE); Cecilia Aguiar Da Silva, Helmsange (LU); Peter Johann Cornelius Maus, Büllingen (BE)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 0 days.

(21) Appl. No.: 19/013,147

(22) Filed: Jan. 8, 2025

(65) Prior Publication Data

US 2026/0192612 A1 Jul. 9, 2026

(51) Int. Cl.
*B60C 19/08* (2006.01)

(52) U.S. Cl.
CPC .................................. *B60C 19/086* (2013.01)

(58) Field of Classification Search
CPC ....... B60C 19/00; B60C 19/08; B60C 19/082; B60C 19/086; B60C 19/088
See application file for complete search history.

(56) References Cited

U.S. PATENT DOCUMENTS 8,960,245 B2 2/2015 Yonetsu
11,376,897 B2 7/2022 Robinson
2006/0102264 A1* 5/2006 Nicolas .................. B60C 19/08 152/152.1
2007/0000585 A1 1/2007 Uchida
2008/0295934 A1 12/2008 Mafune
2008/0308203 A1 12/2008 Kunisawa et al.
(Continued)

FOREIGN PATENT DOCUMENTS

DE 112022004017 T8 9/2024
EP 1533144 B1 9/2006
(Continued)

OTHER PUBLICATIONS

Extended European Search Report for Application No. 25226608.5, dated Apr. 29, 2026.

*Primary Examiner* — Cedrick S Williams
(74) *Attorney, Agent, or Firm* — Eryn A. Fuhrer

(57) ABSTRACT

In one aspect, the present invention is directed to a tire comprising a conductive rubber composition strip having an end, which is i) axially between a first sidewall and an adjacent axially outer surface of a tread base layer, and ii) radially below a tread cap layer, wherein the strip extends along the sidewall from said end at least to an electrically conductive chafer. In another aspect, a tire also has a second conductive rubber composition layer having an edge adjacent an axially outer end region of a belt portion, and extending along a radially inner surface of the tread portion towards a first conductive rubber composition layer. In a third aspect, a tire comprises a conductive circumferential ring portion extending through a shoulder rib and/or row of tread blocks, and/or an adjacent rib or row of tread blocks, and which is in contact with a conductive rubber composition layer.

8 Claims, 11 Drawing Sheets

(56) References Cited

U.S. PATENT DOCUMENTS

| | | | |
|---|---|---|---|
| 2009/0266456 | A1 | 10/2009 | Nakamura |
| 2009/0308512 | A1 | 12/2009 | Nakamura |
| 2013/0284330 | A1 | 10/2013 | Nagai |

FOREIGN PATENT DOCUMENTS

| | | | | | |
|---|---|---|---|---|---|
| EP | 2848434 | A1 | * | 3/2015 | ............. B60C 19/08 |
| EP | 2939855 | A1 | * | 11/2015 | ........... B60C 19/082 |
| EP | 2799247 | B1 | | 7/2016 | |
| JP | 2013193580 | A | * | 9/2013 | |
| JP | 2020040634 | A | * | 3/2020 | |
| JP | 2022098067 | A | | 7/2022 | |
| JP | 2023089367 | A | | 6/2023 | |
| WO | 2016204952 | A1 | | 12/2016 | |

* cited by examiner 1000
1100
1110
1110
1120
1129
1130
EP
1200
1200
1201
1209
1300
1400
1400
1409
1410
1420
1421
1429
1051
1052
1600
1700
1701
1709
r
c
a 2000
2100
2110
2110
2120
2129
2130
EP
2200
2200
2201
2209
2300
2400
2400
2410
2420
2421
2600
2601
2051
2052
2700
2701
2709
2800
2801
2802
r
c
a 3000
3100
3110
3120
3129
3130
3200
3201
3209
3300
3400
3410
3420
3421
3600
3700
3701
3709
3800
3801
3802
3051
3052
EP
r
c
a 4000
4100
4110
4120
4129
4130
EP
4200
4201
4209
4300
4400
4410
4420
4421
4600
4700
4701
4709
4051
4052
r
c
a 5000
5100
5110
5110
5120
5129
5130
EP
5200
5200
5201
5209
5300
5400
5400
5410
5420
5421
5051
5052
5600
5601
5700
5701
5709
5800
5801
5802
r
c
a 6000
6100
6110
6110
6120
6129
6130
6200
6200
6201
6209
6300
6400
6400
6410
6420
6421
6051
6052
6600
6601
6700
6701
6709
6800
6801
6802
EP
r
c
a 8000
8100
8110
8110
8120
8130
EP
8600
8200
8300
8700
8400
8410
8420
8801
8800
8809
8701
8200
8300
8052
8051
8700
8400
8410
8420
r
c
a 9000
9100
9110
9120
9130
9200
9300
9400
9410
9420
9600
9700
9800
9801
9809
9051
9052
EP
r
c
a 2200
2400
2600
2110
2130
EP
2110
2000'
2120
2601
2801
2800
2802
2300
2052
2051
2100
2129
2201'
2701'
2200'
2700'
2709'
2209'
2421
2400
2410
2420
r
c
a 3200
3400
3600
3110
EP
r
c
a
3110
3120
3801
3429
3409
3000'
3130
3800
3802
3300
3052
2051
3100
3129
3201'
3701'
3200'
3700'
3709'
3209'
3421
3400
3410
3420

TIRE WITH ELECTRICALLY CONDUCTIVE PATHWAY

BACKGROUND OF THE INVENTION

Modem truck tires are typically durable and have a low rolling resistance. In order to further improve energy efficiency of such tires, it is possible to use rubber compositions with low hysteresis and/or rolling resistance. However, some of such rubber compositions exhibit a considerably lower electrical conductivity, which may impair the transport of electrical charges from the vehicle to the road. Despite developments in this field over the past years, significant room for improvement remains to provide advanced electrical pathways through tires.

SUMMARY OF THE INVENTION

In a first aspect, the present invention is directed to a pneumatic tire comprising a pair of axially opposite bead portions, wherein each bead portion of the pair of bead portions comprises a bead and a chafer. Furthermore, the tire comprises a tread portion, at least one carcass ply extending at least from one bead portion of the pair of bead portions to an axially opposite bead portion of the pair of bead portions, and a belt portion arranged radially between the tread portion and the at least one carcass ply in a crown region of the tire. Moreover, the tire comprises a pair of axially opposite sidewalls, wherein each sidewall of the pair of axially opposite sidewalls extends from an axially outer end region of the tread portion radially inwards to a respective one of the bead portions, wherein the tread portion comprises at least one radially outer tread cap layer and at least one radially inner electrically conductive tread base layer. Still in accordance with the first aspect, the tire comprises an electrically conductive rubber composition strip having a first strip end, which is arranged i) axially between the first sidewall and an adjacent axially outer surface of the tread base layer, and ii) radially below the tread cap layer, and extending along an axially inner side of a first sidewall of the pair of sidewalls from the first strip end at least to a respective chafer of the respective one of the bead portions adjacent the first sidewall, wherein the respective chafer is an electrically conductive chafer.

In a second aspect of the present invention, the invention is directed to a pneumatic tire comprising a pair of axially opposite bead portions, wherein each bead portion of the pair of bead portions comprises a bead and a chafer. Furthermore, the tire comprises a tread portion, and at least one carcass ply extending at least from one bead portion of the pair of bead portions to an axially opposite bead portion of the pair of bead portions. Moreover, the tire comprises a belt portion arranged radially between the tread portion and the at least one carcass ply in a crown region of the tire. Still in accordance with the second aspect, the tire comprises a pair of axially opposite sidewalls, wherein each sidewall of the pair of axially opposite sidewalls extends from an axially outer end region of the tread portion and radially inwards to a respective one of the bead portions. Moreover, the tire comprises a first electrically conductive rubber composition layer having a radially outer edge, which is arranged axially between the first sidewall and an axially outer surface of the tread portion, and extending on an axially inner side of a first sidewall of the pair of sidewalls from the radially outer edge at least to a respective chafer of the respective one of the bead portions adjacent the first sidewall, wherein the respective chafer is an electrically conductive chafer. Furthermore, the tire comprises a second electrically conductive rubber composition layer having an edge which is a) adjacent an axially outer end region of the belt portion neighboring the first sidewall, and b) radially below a radially inner surface of the tread portion, wherein the second electrically conductive rubber composition layer extends from its edge along the radially inner surface of the tread portion towards the first electrically conductive rubber composition layer so as to contact the first electrically conductive rubber composition layer.

In a third aspect, the present invention is directed to a pneumatic tire comprising a pair of axially opposite bead portions, wherein each bead portion of the pair of bead portions comprises a bead and a chafer. Furthermore, the tire comprises a tread portion, and at least one carcass ply extending at least from one bead portion of the pair of bead portions to an axially opposite bead portion of the pair of bead portions. Moreover, the tire comprises a belt portion arranged radially between the tread portion and the at least one carcass ply in a crown region of the tire, and a pair of axially opposite sidewalls, wherein each sidewall of the pair of axially opposite sidewalls extends from an axially outer end region of the tread portion and radially inwards to a respective one of the bead portions. In particular, said tread portion comprises a radially outer electrically non-conductive tread cap layer, a radially inner electrically non-conductive tread base layer, and an electrically conductive circumferential ring portion extending through the tread portion from a radially outermost surface of the tread cap layer to a radially innermost surface of the tread portion to provide an electrically conductive pathway through the tread portion. Furthermore, the tread portion has one or more of a plurality of circumferential tread ribs and a plurality of circumferential rows of tread blocks, and wherein the circumferential ring portion extends through one of i) one of a shoulder tread rib of the plurality of circumferential tread ribs and a row of shoulder tread blocks of the plurality of circumferential rows of tread blocks, and ii) one of a tread rib axially adjacent the shoulder tread rib and a row of tread blocks axially adjacent the row of shoulder tread blocks, and wherein the tire further comprises an electrically conductive rubber composition layer extending from the electrically conductive circumferential ring portion, at the radially inner surface of the tread portion, and along the radially inner surface of the tread portion towards an axially adjacent sidewall of the pair of sidewalls.

BRIEF DESCRIPTION OF THE DRAWINGS

The invention will be described by way of example and with reference to the accompanying drawings in which.

DETAILED DESCRIPTION OF THE INVENTION

Figure 1:
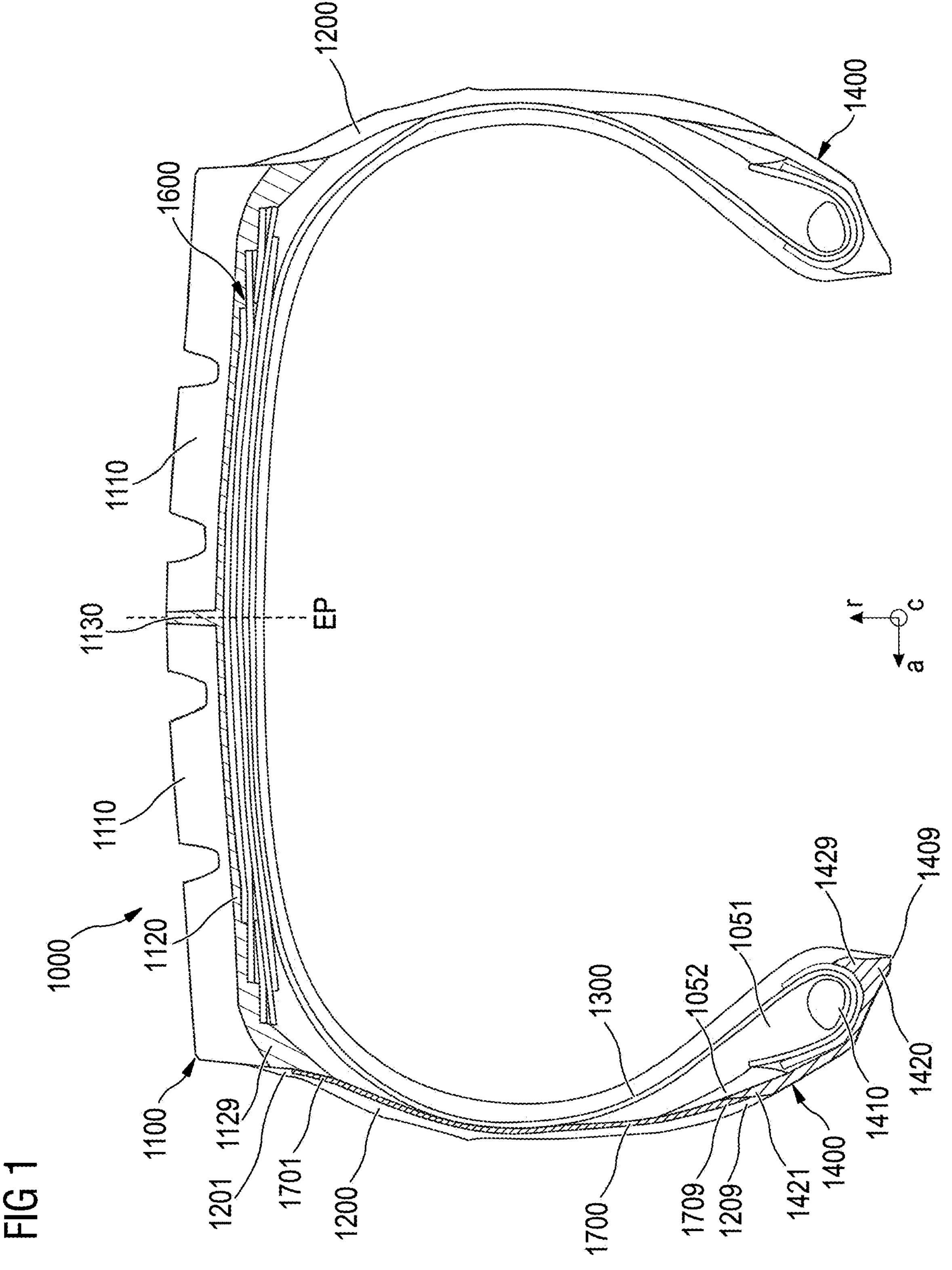
FIG. 1 is a schematic partial cross-section of a tire in accordance with an embodiment of the present invention, in which an electrically conductive rubber composition strip extends from an electrically conductive tread base layer to an electrically conductive chafer.

According to the first aspect, the invention is directed to a pneumatic tire comprising a pair of axially opposite bead portions, wherein each bead portion of the pair of bead portions comprises a bead and a chafer. Furthermore, the tire comprises a tread portion, at least one carcass ply extending at least from one bead portion of the pair of bead portions to an axially opposite bead portion of the pair of bead portions, and a belt portion arranged radially between the tread portion and the at least one carcass ply in a crown region of the tire. Moreover, the tire comprises a pair of axially opposite sidewalls, wherein each sidewall of the pair of axially opposite sidewalls extends from an axially outer end region of the tread portion radially inwards to a respective one of the bead portions, wherein the tread portion comprises at least one radially outer tread cap layer and at least one radially inner electrically conductive tread base layer. Still in accordance with the first aspect, the tire comprises an electrically conductive rubber composition strip having a first strip end, which is arranged i) axially between the first sidewall and an adjacent axially outer surface of the tread base layer, and ii) radially below the tread cap layer, and extending along an axially inner side of a first sidewall of the pair of sidewalls from the first strip end at least to a respective chafer of the respective one of the bead portions adjacent the first sidewall, wherein the respective chafer is an electrically conductive chafer.

Thus, the present invention provides a reliable electrical pathway through the tire from the chafer of the bead portion to the tread portion. Hence, electrical charges can be electrically conducted from a rim to which the tire is mounted, through the chafer, further through the electrically conductive rubber composition strip to the electrically conductive tread base layer of the tread portion. In particular, the sidewall does not need to be electrically conductive, or can be an electrically non-conductive sidewall, which for instance allows to provide a sidewall, or sidewall component, having an improved rolling resistance compared to typical electrically conductive sidewalls. Moreover, as the electrically conductive rubber composition strip (having a first strip end in contact with the tread base layer, and extending at least to the chafer) is not a circumferential layer as a typical tire sidewall, an amount of strip material (e.g., by weight) needed for providing electrical conductivity between the tread portion and the chafer is relatively small.

In one embodiment, the electrically conductive rubber composition strip has a second strip end in contact with a radially outer end region of the electrically conductive chafer. Such an embodiment may be preferred as it minimizes the length of the strip for providing the electrically conductive pathway. However, in other embodiments, the strip may be longer, or, in other words, extend further radially inwards, and optionally around the bead of the bead portion, e.g., as explained further herein below. In addition, or alternatively, the first strip end is preferably in contact with the axially outer surface of the tread base layer.

In another embodiment, the electrically conductive chafer is one or more of extending from a radially innermost tip of the respective bead portion over less than 40% (preferably over less than 30%) of a total radial height of the tire; and extending from a first position, which is radially and axially inside of the adjacent bead, passing an axially outer side of the bead to a second, radially outer position, which is covered by a radially inner end of the first sidewall. Thus, compared to some other chafer constructions, the present chafer can be relatively small. This may be of advantage to reduce the amount of chafer material (typically consisting of an electrically conductive rubber composition).

In still another embodiment, the electrically conductive rubber composition strip has one or more of: a length extension of over more than 50% (preferably more than 60%, and/or less than 90% or less than 80%) of a total radial height of the tire; a circumferential strip width within a range of 1 mm to 80 mm (preferably of 10 mm to 50 mm); a strip thickness within a range of 1 mm to 4 mm, measured perpendicular to a length and a width of the strip (wherein the length of the strip can be measured along the strip between its strip ends); an electrical volume resistivity lower than 108 ohm·cm (preferably lower than 107 ohm·cm); a rubber composition comprising one or more of: more than 40 phr of carbon black (preferably more than 45 phr of carbon black), a carbon black having an iodine absorption of at least 100 g/kg, less than 15 phr of silica (preferably, less than 10 phr of silica, less than 5 phr of silica, or which is essentially devoid of silica); and a rubber composition devoid of one or more of a cord reinforcement (such as metal cords, glass fiber cords, and textile cords), and a fabric reinforcement (such as a textile fabric reinforcement). Such optional properties of the electrically conductive rubber composition strip provide further preferred ways of providing the strip. Electrical volume resistivity is determined herein in accordance with ASTM D257-98, or equivalent. Iodine absorption or iodine absorption values (sometimes also called iodine numbers or iodine absorption numbers) are determined herein according to ASTM D1510, or equivalent. Electrically conductive is understood herein as having an electrical volume resistivity lower than 108 ohm·cm. Being not electrically conductive, or electrically non-conductive/insulating, is understood herein as having an electrical volume resistivity higher than 109 ohm·cm, unless indicated otherwise herein.

In still another embodiment, the first sidewall (or in other words first sidewall component) extends from a radially outer end of the first sidewall, where the sidewall is in contact with an axially outer end of the tread cap layer, to a radially inner end of the first sidewall, where the first sidewall is in contact with an axially outer side and/or the radially outer end region of the electrically conductive chafer. In practice, a sidewall, or a sidewall component, can be distinguished in the tire from other tire components, such as a tread cap layer, a tread base layer, a chafer, a rubber composition strip, and other tire components by providing a cross-section of the tire, e.g., by cutting the tire perpendicularly to its equatorial plane, as typical in the art. In such a cross-section, different tire components can be identified.

In still another embodiment, the electrically conductive rubber composition strip further extends along the chafer, around the bead (and/or through the bead portion), and further along the carcass ply to an opposite lateral (or axial) side of the tire, and optionally, at least around the bead (and/or through the bead portion) of another one of the bead portions at the opposite lateral (or axial) side of the tire. Such a relatively long strip extension may be used in case it is desired to further increase reliability of electrical charge conduction. Optionally, the strip further extends up to an axially outer end region of the tread base layer at the laterally opposition side of the tire. Optionally, the laterally opposite chafer is electrically non-conductive, which may allow to use a rubber composition for that chafer which has lower rolling resistance, while still conducting charges from the chafer in contact with the first sidewall through the strip to both axially outer end regions of the tread base layer. Alternatively, it is possible to have both chafers, i.e., on each lateral side of the tire, electrically conductive, which provides an even more reliable way of providing an electrical pathway. Even in such an embodiment, the amount of electrically conductive rubber compositions in the tire can be relatively small as the strip is not a circumferential layer and has a relatively low mass.

In still another embodiment, the tire has a first (bead) apex arranged radially above the bead of the bead portion adjacent the first sidewall, and a second apex provided axially outside of the first apex, which is optionally in contact with an end of the carcass ply provided at an axially outer side of the first apex. Optionally, one or more of the apexes have a tip pointing essentially in a radially outer direction.

In still another embodiment, the electrically conductive rubber composition strip extends radially inwards along an axially inner side of the second apex and further at least to an axially inner side of the electrically conductive chafer. For instance, such an arrangement helps to simplify tire building and/or strip application.

In still another embodiment, each axially outer end region of the tread base layer and/or each axially outer end region of the belt portion is supported on a shoulder wedge, which is preferably provided at least partially radially below said axially outer end region of the tread base layer and/or said axially outer end region of the belt portion.

In still another embodiment, at least one of the tread portion, the tread cap layer and the tread base layer comprises an electrically conductive circumferential ring portion, preferably having an axial thickness (or maximum axial thickness) of less than 10 mm, and extending from the tread base layer to a radially outermost surface of the tread portion. Such a ring portion is sometimes also mentioned as (electrically) conductive chimney. However, apart from the present embodiment, other ways are possible to provide electrical conductivity through the tread portion, such as from an electrically conductive tread base (or tread base layer) through the tread cap (or tread cap layer). In an option, the tread cap may comprise an electrically conductive rubber composition. For instance, the tread cap, or tread cap layer, may comprise such an electrically conductive rubber composition over its whole axial width. Alternatively, the tread cap, or tread cap layer, may be axially split into multiple circumferential tread cap, or tread cap layer strips (which extend along a circumferential direction of the tire), one or more of the strips may be electrically conductive and one or more of the strips may be electrically non-conductive. In another option, the electrically conductive and/or circumferential ring portion is integrally formed with the tread base layer, such as formed by the same rubber composition. In still another option, the electrically conductive circumferential ring portion extends from a radially inner bottom of the tread base layer through the tread base layer and through the tread cap layer to the radially outermost surface of the tread portion.

In still another embodiment, one or more of the electrically conductive rubber composition strip (or layer of other aspects mentioned herein), the electrically conductive tread base layer, the electrically conductive chafer, and the electrically conductive circumferential ring portion have an electrical volume resistivity lower than 107 ohm·cm; and/or wherein one or more of the tread cap layer (or a portion thereof), one or more of the sidewalls, a rubber coating composition of the at least one carcass ply, an innerliner of the tire, at least another chafer of the tire, have an electrical volume resistivity higher than 1010 ohm·cm. Preferably, both sidewalls (or sidewall components), and/or the rubber coating composition of the carcass ply are electrically non-conductive, or preferably have the above mentioned electrical volume resistivity properties.

In still another embodiment, the tire comprises two electrically conductive rubber composition strips, wherein one of the strips is provided on each lateral side of the tire. Thus, in other words, the tire preferably comprises another, or a second, electrically conductive rubber composition strip having a first strip end, which is i) axially between a second sidewall of the pair of sidewalls and an adjacent axially outer surface of the tread base layer, and ii) radially below the tread cap layer, and/or wherein said another electrically conductive rubber composition strip extends along an axially inner side of the second sidewall (which is axially opposite to the first sidewall) of the pair of sidewalls from its first strip end (preferably being in contact with the tread base layer), at least to a respective chafer of the respective one of the bead portions adjacent the second sidewall, wherein the respective (second) chafer is an electrically conductive chafer. Optionally, a second strip end of said another strip is in contact with a radially and/or axially outer end region of the (second) electrically conductive chafer.

According to said second aspect, the invention is directed to a pneumatic tire comprising a pair of axially opposite bead portions, wherein each bead portion of the pair of bead portions comprises a bead and a chafer. Furthermore, the tire comprises a tread portion, and at least one carcass ply extending at least from one bead portion of the pair of bead portions to an axially opposite bead portion of the pair of bead portions. Moreover, the tire comprises a belt portion arranged radially between the tread portion and the at least one carcass ply in a crown region of the tire. Still in accordance with the second aspect, the tire comprises a pair of axially opposite sidewalls (or sidewall components), wherein each sidewall of the pair of axially opposite sidewalls extends from an axially outer end region of the tread portion and radially inwards to a respective one of the bead portions. Moreover, the tire comprises a first electrically conductive rubber composition layer having a radially outer edge which is arranged axially between the first sidewall and an axially outer surface of the tread portion (preferably in contact with the axially outer surface of the tread portion), and extending on an axially inner side of a first sidewall (or sidewall component) of the pair of sidewalls (or sidewall components) from the radially outer edge at least to a respective chafer of the respective one of the bead portions adjacent the first sidewall, wherein the respective chafer is an electrically conductive chafer. Furthermore, the tire comprises a second electrically conductive rubber composition layer having an edge which is a) adjacent an axially outer end region of the belt portion, neighboring the first sidewall, and b) radially below (and preferably contacting) a radially inner surface of the tread portion, wherein the second electrically conductive rubber composition layer extends from its edge along the radially inner surface of the tread portion towards the first electrically conductive rubber composition layer so as to contact the first electrically conductive rubber composition layer.

Thus, the combination of the two electrically conductive rubber composition layers according to the second aspect, provides a higher reliability of electrical conduction between tread portion and chafer. For instance, in case positioning of either the first or the second electrically conductive rubber composition layer is not fully accurate so that, e.g., electrical contact is not (sufficiently) provided to the tread portion by one of the layers, the other one of the first and second electrically conductive rubber composition layers can still provide a reliable electrical pathway.

In one embodiment, the first electrically conductive rubber composition layer is a first electrically conductive rubber composition strip, such as extending (e.g., with its strip length) essentially radially inwards along the first sidewall, and/or perpendicularly to the circumferential direction. In other words, a width of the strip preferably extends along the circumferential direction. A strip provides a relatively small amount of material required to provide an electrical pathway.

In another embodiment, the second electrically conductive rubber composition layer is a second electrically conductive rubber composition strip extending along (and thus in contact with) the radially inner surface of the tread portion towards the first electrically conductive rubber composition strip so as to contact the first electrically conductive rubber composition strip. Optionally, the second strip can also be considered as extending (with its strip length) perpendicularly to the circumferential direction, and/or with its strip width in parallel to the circumferential direction.

In still another embodiment, an aspect ratio of one or more of the electrically conductive rubber composition strips of strip length to strip width is at least 2 to 1, and/or preferably ranges from 2 to 1 to 50 to 1.

In still another embodiment, one or more of the electrically conductive rubber composition strips have an essentially rectangular cross-section, determined perpendicular to their strip length.

In still another embodiment, an aspect ratio of one or more of the electrically conductive rubber composition strips of (e.g., circumferential) strip width to strip thickness is at least 2 to 1, and/or preferably ranges from 5 to 1 to 30 to 1.

In still another embodiment, the first electrically conductive rubber composition layer extends along the whole (or 360° of the) circumference of the tire, and/or the second electrically conductive rubber composition layer is an electrically conductive rubber composition strip extending with its strip length along the radially inner surface of the tread portion towards the first electrically conductive rubber composition layer so as to contact the first electrically conductive rubber composition layer. In such an embodiment, the first rubber composition layer can be extruded together with the sidewall as one component, or in other words integrally extruded with the sidewall.

In still another embodiment, one or more of the first electrically conductive rubber composition layer and the second electrically conductive rubber composition layer can, e.g., extend along the circumferential direction of the tire, such as along the whole circumference of the tire. Alternatively, each of these layers can be a strip having a radially outer strip end as the radially outer edge, and/or extend with its length essentially perpendicular to the circumferential direction, and/or have a strip width extending in the circumferential direction of the tire.

In still another embodiment, the tread portion comprises at least one radially outer tread cap layer and at least one radially inner electrically conductive tread base layer. Optionally, the radially outer edge of the first electrically conductive rubber composition layer (such as a strip) is provided radially below the tread cap layer and/or contacts the tread base layer.

According to the third aspect, the invention is directed to a pneumatic tire comprising a pair of axially opposite bead portions, wherein each bead portion of the pair of bead portions comprises a bead and a chafer. Furthermore, the tire comprises a tread portion, and at least one carcass ply extending at least from one bead portion of the pair of bead portions to an axially opposite bead portion of the pair of bead portions. Moreover, the tire comprises a belt portion arranged radially between the tread portion and the at least one carcass ply in a crown region of the tire, and a pair of axially opposite sidewalls, wherein each sidewall of the pair of axially opposite sidewalls extends from an axially outer end region of the tread portion and radially inwards to a respective one of the bead portions. In particular, said (circumferential) tread portion comprises a radially outer electrically non-conductive (circumferential) tread cap layer, a radially inner electrically non-conductive (circumferential) tread base layer, and an electrically conductive circumferential ring portion extending through the tread portion from a radially outermost surface of the tread cap layer to a radially innermost surface of the tread portion (such as of its tread base layer) to provide an electrically conductive pathway through the tread portion. Furthermore, the tread portion has one or more of a plurality of circumferential tread ribs and a plurality of circumferential rows of tread blocks, and wherein the circumferential ring portion extends through one of i) one of a shoulder tread rib of the plurality of circumferential tread ribs and a row of shoulder tread blocks of the plurality of circumferential rows of tread blocks, and ii) one of a tread rib axially adjacent the shoulder tread rib and a row of tread blocks axially adjacent the row of shoulder tread blocks, and wherein the tire further comprises an electrically conductive rubber composition layer extending from the electrically conductive circumferential ring portion, at the radially inner surface of the tread portion, and along the radially inner surface of the tread portion towards an axially adjacent sidewall of the pair of sidewalls.

Thus, the provision of the electrically conductive circumferential ring portion in one of the above-mentioned ribs or rows of tread blocks, helps to provide a short electrical pathway through the tire, particularly towards an axially adjacent sidewall. In other words, said ring portion is provided at an axially asymmetrical position and/or axially closer to an axially outermost surface of an adjacent sidewall than to an equatorial plane of the tire.

In one embodiment, the electrically conductive rubber composition layer is an electrically conductive rubber composition strip extending with its strip length from a radially inner end of the circumferential ring portion towards the adjacent sidewall.

In another embodiment, the electrically conductive rubber composition strip extends over less than a third (or, optionally, less than a quarter) of a total axial width of the tread portion.

In still another embodiment, an axially inner strip end of the strip is axially closer to an axially outermost surface of the sidewall than to an equatorial plane of the tire.

In still another embodiment, the tire comprises a further electrically conductive rubber composition layer extending on and/or along an axially inner side of the adjacent (preferably electrically non-conductive) first sidewall, wherein the further electrically conductive rubber composition layer is one or more of a) at its radially outer end region, in contact with the electrically conductive rubber composition layer or strip, and b) at its radially inner end (or edge), in contact with a chafer of the respective one of the bead portions adjacent the first sidewall, wherein the chafer is an electrically conductive chafer.

In still another embodiment, the further electrically conductive rubber composition layer is a further electrically conductive rubber composition strip, optionally having a width extending in a circumferential direction of the tire and/or a strip length extending from its first radially outer strip end, which is axially between the first sidewall and an adjacent axially outer surface of the tread base layer, to its second radially inner strip end, which is in contact with the electrically conductive chafer. Optionally, an end region may comprise an end, which applies also to other features and/or embodiments mentioned herein.

In still another embodiment, the pneumatic tire is one or more of a pneumatic truck tire; one or more of a 17.5, 19.5, 22.5, and 24.5 inch tire (preferably a 22.5 inch tire); and a pneumatic tire, in which the belt portion comprises at least four belt plies reinforced with metal cords and/or wires, and/or the carcass ply is reinforced with metal cords and/or wires.

FIG. 1 is a schematic partial cross-section of a tire 1000, which comprises a tread portion 1100 having an electrically non-conductive tread cap or tread cap layer 1110 and an electrically conductive tread base or tread base layer 1120. The tread portion 1100, and in the present embodiment particularly the tread base layer 1120 includes a circumferential electrically conductive ring portion 1130 extending radially inwards from a radially outermost surface of the tread portion 1100 through the tread cap layer 1110, particularly along an equatorial plane EP of the tire. Moreover, the tire 1000 has two sidewall components, or sidewalls 1200. At a radially outer end region 1201, a sidewall 1200 axially covers at least partially an axially outer end or side of the tread portion 1100, particularly at least partially an axially outer side of an axially outer end region 1129 of the tread base layer 1120. Thus, the present tire 1000, has a sidewall over tread (SOT) construction. Moreover, the tire 1000 comprises a pair of bead portions 1400, which are provided at each lateral side of the tire 1000, wherein each bead portion 1400 comprises a bead 1410, and a chafer 1420, forming a radially innermost tip 1409 of the respective bead portion 1400. The chafer 1420, has an axially inner end region 1429 and a radially outermost end region 1421 at an axially outer side of the bead portion 1400. The sidewall 1200 contacts, with its radially inner end 1209, the radially outer end region 1421 of the chafer 1420. In the present embodiment, the sidewalls 1200 are electrically non-conductive. The same applies to the carcass ply 1300 (and particularly to its respective coating rubber composition) which extends from one of the bead portions 1400 to a laterally opposite one of the bead portions 1400). A first (bead) apex 1051, and a second apex 1052, are preferably also electrically non-conductive, in other words consist of electrically non-conductive rubber compositions. The second apex 1052 is arranged essentially in parallel with the first bead apex 1051 in a radially upper region of the first apex 1051. Furthermore, the tire 1000 comprises a belt portion 1600, which comprises in the present and non-limiting example four belts.

Still in accordance with the present embodiment of the invention, an electrically conductive rubber composition strip 1700 is provided along an axially inner side of the sidewall 1200, extending from a first, radially outer strip end 1701 to a second, radially inner strip end 1709. The first strip end 1701 is provided in contact with an axially outer edge or side of the tread base layer 1120, and/or in contact with the axially outer end region 1129 of the tread base layer 1120. The strip extends from its radially outer end 1701 radially inwards to the radially inner strip end 1709 being in contact with the radially outer end region 1421 of the chafer 1420 which is electrically conductive in the present embodiment. In other words, said chafer 1420 comprises or consists of an electrically conductive rubber composition. Thus, an electrically conductive pathway is provided in the present embodiment, from a rim (not explicitly shown herein) via the electrically conductive chafer 1420, to the strip end 1709 in contact with the chafer 1420, through the strip 1700 to the radially outer strip end 1701, further through the axially outer end region 1129 of the tread base layer 1120, through the base layer 1120 and the circumferential ring portion 1130 towards the radially outermost surface of the tread portion 1100 and/or tread cap layer 1110, which is typically in contact with the ground or road.

The axial direction a, the radial direction r, and the circumferential direction c are indicated in FIG. 1, and in further Figures shown herein. The axial direction a is parallel to the axis of rotation of the tire. The radial direction r is perpendicular to the axial direction a, and in parallel to the equatorial plane EP. Furthermore, the circumferential direction c is parallel to the equatorial plane EP of the tire and perpendicular to the axial direction a, and to the radial direction r. A reference to one of these directions is not necessarily limited to a certain orientation of such a direction, unless indicated otherwise herein.

Figure 2:
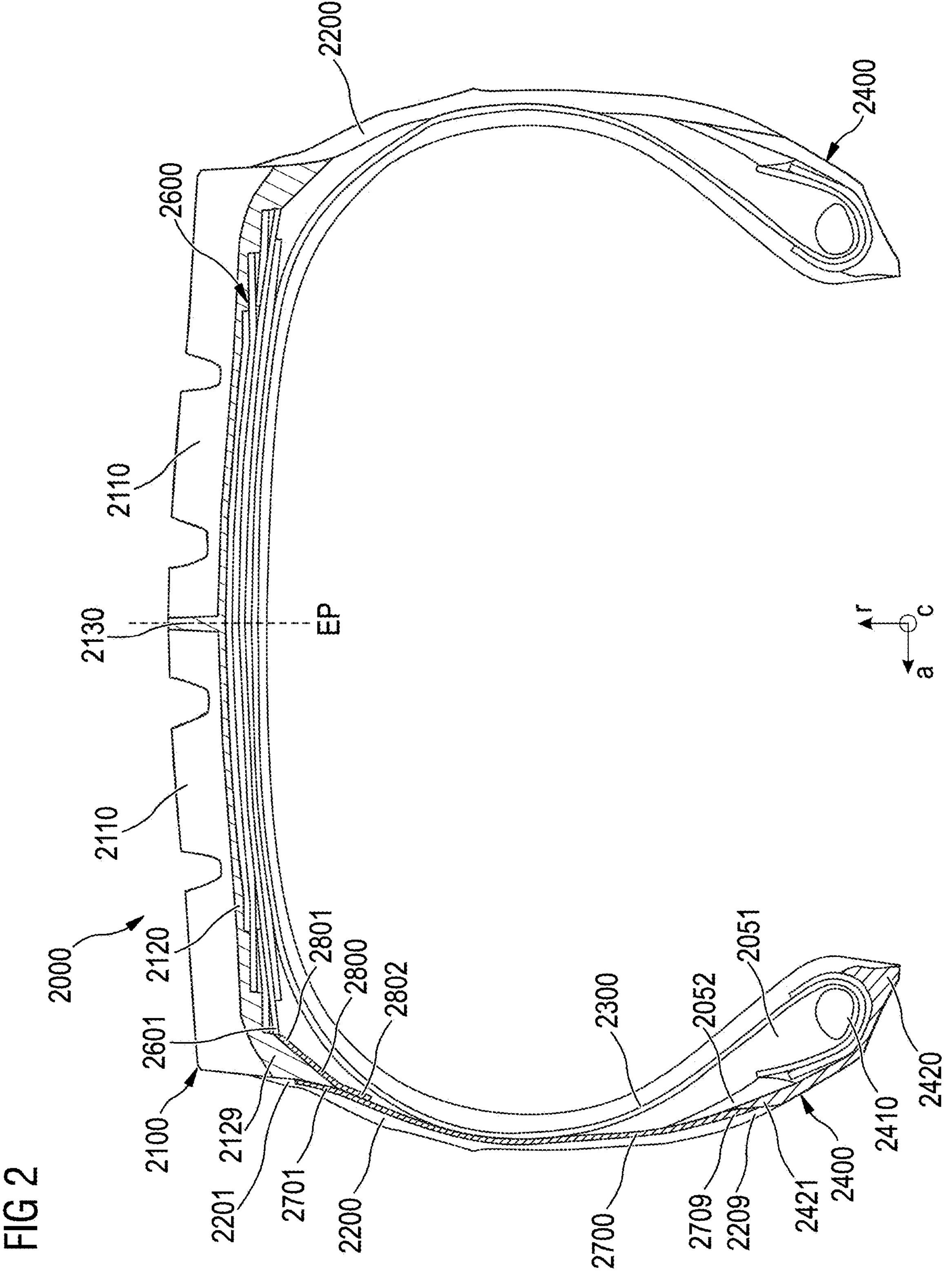
FIG. 2 is a schematic partial cross-section of a tire in accordance with another embodiment of the present invention, in which a first electrically conductive rubber composition strip extends from an electrically conductive tread base layer to an electrically conductive chafer, and a second electrically conductive rubber composition strip extends from a radially inner side or surface of the tread base layer to an axially inner side of the first electrically conductive rubber composition strip.

FIG. 2 shows a cross-section of another tire 2000, in accordance with another embodiment of the present invention. One or more of the position, shape, and function of multiple components of the tire 2000 are the same or similar as for the tire 1000 already described with respect to FIG. 1 so that those are not described in all details again with respect to FIG. 2, or other Figures mentioned herein below. Thus, corresponding to tire 1000 of FIG. 1, the tire 2000 according to FIG. 2 comprises a tread portion 2100, with a tread cap layer 2110, a tread base layer 2120, a circumferential ring portion 2130, a belt portion 2600, a pair of axially opposite sidewalls 2200, a pair of bead portions 2400, each with a bead 2410 and a chafer 2420, a carcass ply 2300, a first apex 2051, and a second apex 2052. Similar to the embodiment of FIG. 1, the tire 2000 according to the embodiment of FIG. 2 also includes an electrically conductive rubber composition strip 2700 which has a radially outer end 2701 in contact with an axially outer end region 2129 of the tread base layer 2120 and a radially inner end 2709 in contact with a radially and/or axially outer end region of the chafer 2421. The strip 2700 is entirely covered by the sidewall 2200. In particular, a radially outer edge or end 2201 of the sidewall 2200 extends further in a radially outer direction than the strip 2700. In a radially inner direction, the sidewall 2200 extends with its radially inner end 2209 further radially inwards than the electrically conductive rubber composition strip 2700.

Further to the aforementioned components and/or features, the embodiment of FIG. 2, comprises a second electrically conductive rubber composition strip 2800 which extends from an axially outer end region 2601 of the belt portion 2600 and/or in contact with a radially inner surface or side of the tread base layer 2120, and along the tread base layer 2120 to (a radially outer end region of) the first electrically conductive rubber composition strip 2700. While a first end 2801 of the second electrically conductive rubber composition strip 2800 is shown in contact with the belt portion 2600, such a contact is not absolutely necessary. In particular, it is desired that the second electrically conductive rubber composition strip 2800 is in contact with the electrically conductive tread base layer 2120, and its second end 2802 is in contact with the first electrically conductive rubber composition strip 2700, particularly with a radially outer end region of the first electrically conductive rubber composition strip 2700. Such an arrangement has particular advantages, as it might happen that an overlap of the first electrically conductive rubber composition strip 2700 with an axially outer surface of the tread base layer 2120 is very short or does not exist in view of a potential variation in a tire building process. In order to avoid such situations, although unlikely, and in order to provide an even more reliable electrical pathway, the second electrically conductive rubber composition strip 2800 helps to provide a reliable electrical pathway between the bead portion 2400 and the tread portion 2100. Moreover, such an electrical pathway is entirely protected within the tire 2000.

Figure 3:
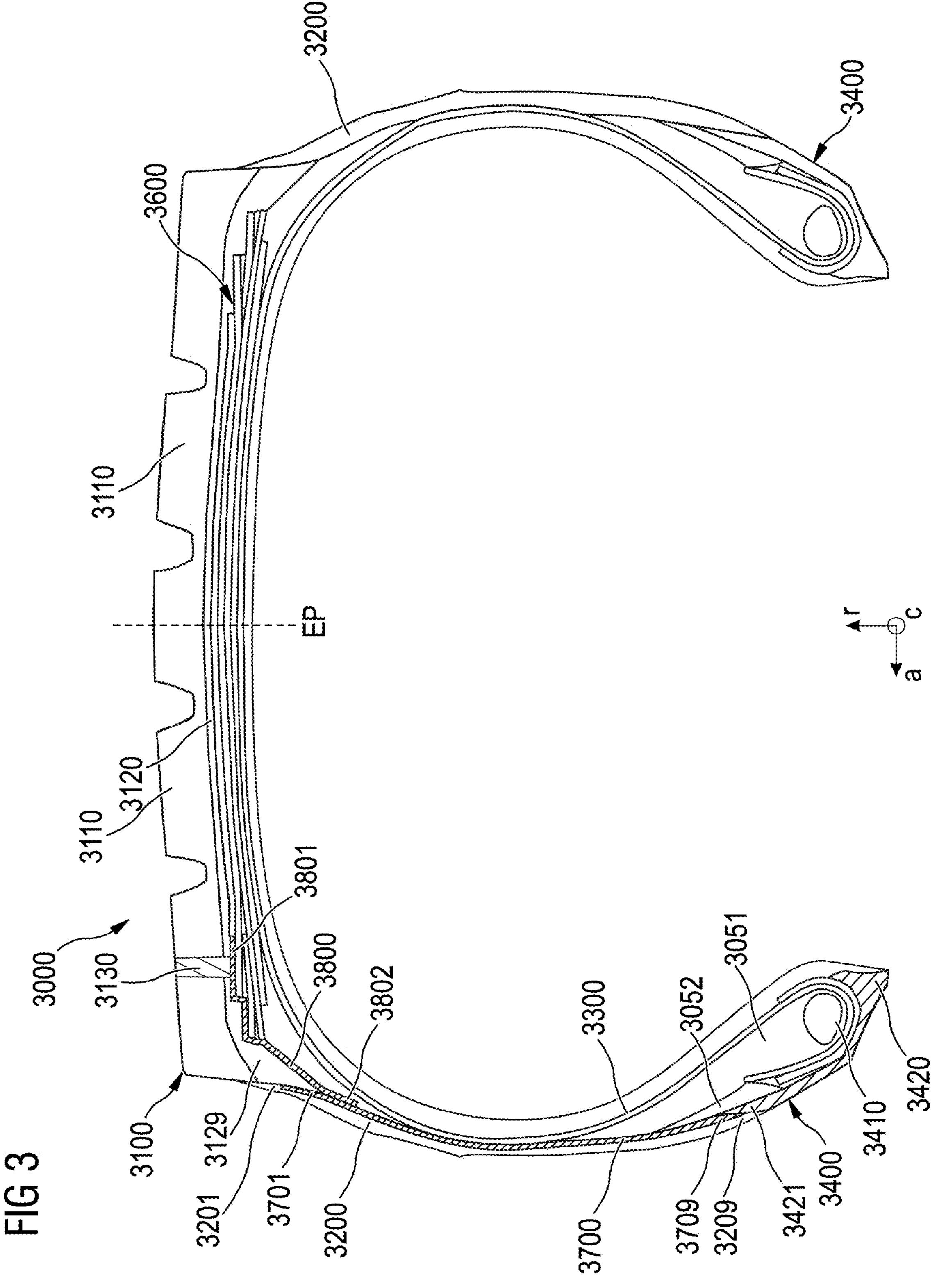
FIG. 3 is a schematic partial cross-section of a tire in accordance with yet another embodiment of the present invention, in which a first electrically conductive rubber composition strip extends along an inner side of a sidewall to an electrically conductive chafer, and a second electrically conductive rubber composition strip extends from a radially inner side or surface of an electrically conductive ring portion along an electrically non-conductive tread base layer to an axially inner side of the first electrically conductive rubber composition strip.

FIG. 3 shows another schematic cross-section of yet another tire 3000, in accordance with yet another embodiment of the present invention. One or more of the position, shape, and function of multiple components of the tire 3000, are the same or similar as for the embodiments described herein above (and/or below) so that those are not described in all details again with respect to FIG. 3. Thus, the tire 3000 according to FIG. 3 comprises a tread portion 3100, with a tread cap layer 3110, a tread base layer 3120, a belt portion 3600, a pair of axially opposite sidewalls 3200, a pair of axially opposite bead portions 3400, each with a bead 3410 and a chafer 3420, a carcass ply 3300, a first apex 3051, and a second apex 3052. Similar to the aforementioned embodiments, the tire 3000, according to the embodiment of FIG. 3, also includes an electrically conductive rubber composition strip 3700 which has a radially outer end 3701 in contact with a neighboring axially outer end region 3129 of the tread base layer 3120 and a radially inner end 3709 in contact with a radially and/or axially outer end region of the chafer 3421. The strip 3700 is entirely covered and thus protected by the sidewall 3200. In particular, a radially outer edge or end 3201 of the sidewall 3200 extends further in a radially outer direction than the strip 3700. In a radially inner direction, the sidewall 3200 extends with its radially inner end 3209 further radially inwards than the electrically conductive rubber composition strip 3700.

In contrast to the embodiments of FIGS. 1 and 2, the embodiment of FIG. 3 comprises an electrically conductive circumferential ring portion 3130 which is not arranged in an axial center region of the tire 3000 or tread portion 3100, respectively, but in a shoulder rib of the tread portion 3100. Moreover, the circumferential ring portion 3113 extends from a radially outermost surface of the shoulder rib radially inwards through the tread cap layer 3110 and through the tread base layer 3120. While the circumferential ring portion 3130 is electrically conductive, the tread cap layer 3110 and the tread base layer 3120 are not electrically conductive in the present embodiment. In order to establish an electrically conductive pathway from the electrically conductive rubber composition strip 3700 to the electrically conductive ring portion 3130, a radially inner end or edge of the circumferential electrically conductive ring portion 3130 is electrically connected via the electrically conductive rubber composition strip 3800 with an axially inner surface of the electrically conductive rubber composition strip 3700. Radially below the circumferential ring portion 3130, a first strip end region and/or strip end 3801 is preferably arranged between an axially outer end region of the belt portion 3600 and a radially inner end of the circumferential ring portion 3130. Such an arrangement helps to ensure a reliable electrical connection between the circumferential ring portion 3130 and the electrically conductive rubber composition strip 3800. Preferably, said electrically conductive rubber composition strip 3800 extends between the circumferential ring portion 3130 and its second strip end 3802 along a radially inner side of the tread base layer 3120. Furthermore, the electrically conductive rubber composition strip 3800 extends at its second strip end 3802 in parallel to and/or in contact with the electrically conductive rubber composition strip 3700. In the present embodiment, in view of the provision of said electrically conductive rubber composition strips 3700, 3800, which do not extend along the whole circumference of the tire, and the provision of the radially extending circumferential ring portion 3130 in a shoulder rib, the provided electrically conductive pathway is relatively short, and the total amount of electrically conductive rubber composition material is relatively small which helps to provide a tire with improved rolling resistance properties.

Figure 4:
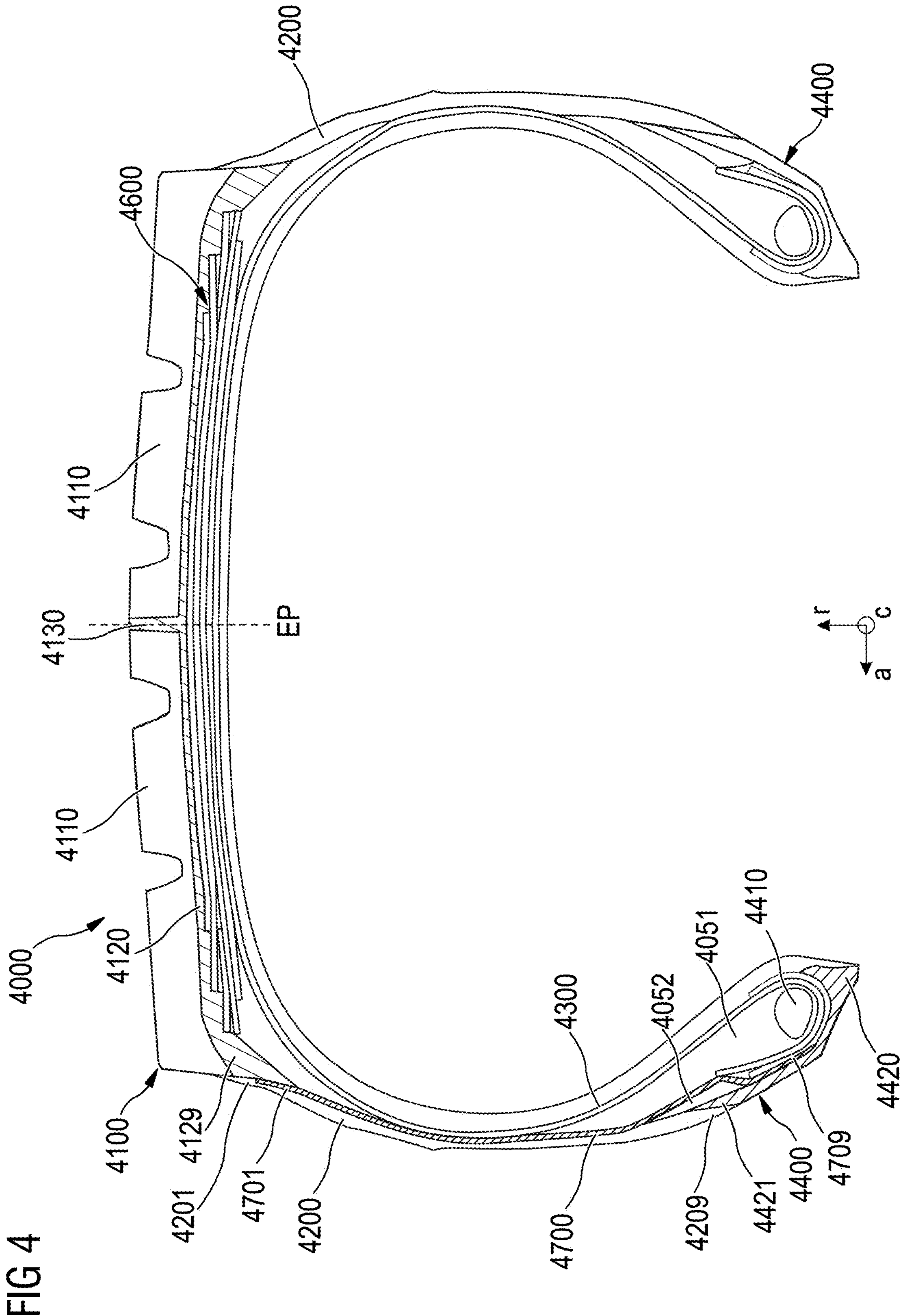
FIG. 4 is a is a is a schematic partial cross-section of a tire in accordance with still another embodiment of the present invention, in which an electrically conductive rubber composition strip extends from an electrically conductive tread base layer to an axially inner side of an electrically conductive chafer in an axially outer region of the bead portion.

FIG. 4 shows a schematic cross-section of yet another tire 4000, in accordance with yet another embodiment of the present invention. One or more of the position, shape, and/or function of multiple components of the tire 4000, are the same or similar as for other embodiments described herein so that those are not described in all details again with respect to FIG. 4. Thus, tire 4000 according to FIG. 4 comprises a tread portion 4100, with a tread cap layer 4110, a tread base layer 4120 including again a circumferential ring portion 4130, a belt portion 4600, a pair of axially opposite sidewalls 4200, a pair of axially opposite bead portions 4400, each with a bead 4410 and a chafer 4420, a carcass ply 4300, a first apex 4051, and a second apex 4052. Similar to the aforementioned embodiments, the tire 4000 according to the embodiment of FIG. 4 also includes an electrically conductive rubber composition strip 4700 which has a radially outer end 4701 in contact with an axially outer end region 4129 of the tread base layer 4120.

The radially inner end 4709 of the electrically conductive rubber composition strip 4700 is provided at a different position than in the embodiments of FIGS. 1 to 3. In particular, the strip 4700 extends from its first end 4701, along an axially inner side of the sidewall 4200 towards the second apex 4052 and further extends between the second apex 4052 (and on an axially inner side of the second apex 4052) and an axially outer side of the first bead apex 4051, further radially inwards to an axially inner side or surface of the respective chafer 4420 in said radially outer end region of the chafer 4420 which is provided at an axially outer side of the bead portion 4400. Thus, the radially inner end 4709 of the electrically conductive rubber composition strip 4700 is provided between bead 4410 and chafer 4420, particularly axially outwards the bead 4410 and/or contacting the chafer 4420. In the present embodiment, the electrically conductive rubber composition strip 4700 extends over more than 50% of a total radial height of the chafer 4420. Moreover, it extends along the complete radial height of the first apex 4051 and/or the second apex 4052. As in the previous embodiments, the adjacent sidewall 4200 extends from a radially outer edge or end 4201, which extends in a radially outer direction further than the electrically conductive rubber composition strip 4700, to a radially inner edge or end 4209, which covers a radially outer end of the radially outer end region 4421 of the chafer 4420, as well as a radially outer end of the second apex 4052.

Figure 5:
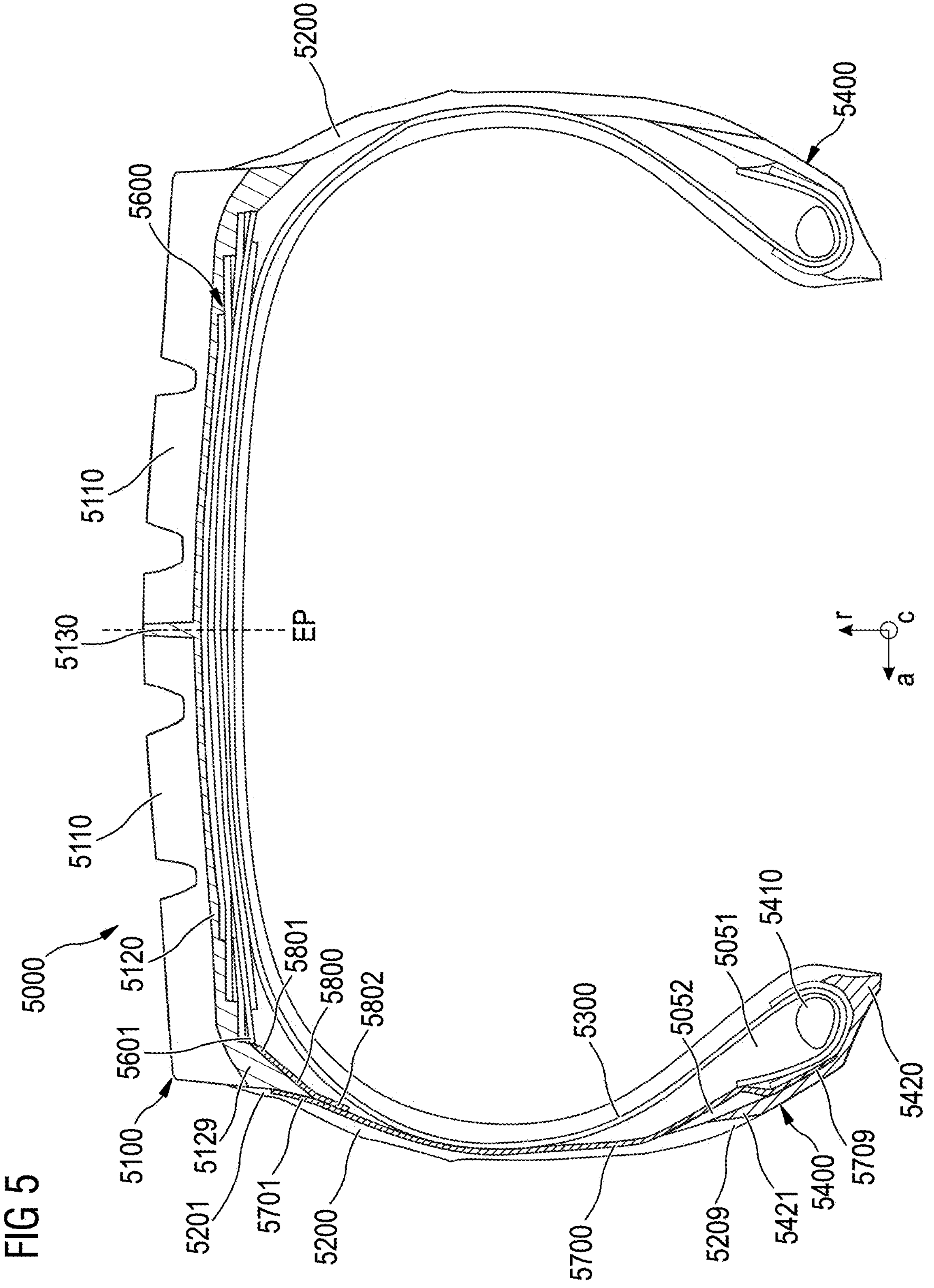
FIG. 5 is a schematic partial cross-section of a tire in accordance with still another embodiment of the present invention, which is similar to the embodiment of FIG. 2, but wherein a radially inner end of the respective first electrically conductive rubber composition strip is provided on an axially inner side of the respective chafer in an axially outer region of the bead portion.

FIG. 5 shows still another schematic cross-section of an embodiment of a tire 5000 according to the present invention, wherein a radially inner end 5709 of the respective electrically conductive rubber composition strip 5700 is arranged in the same manner as in the previously described embodiment according to FIG. 4. In addition, according to the embodiment of FIG. 5, a second electrically conductive rubber composition strip 5800 is provided, which extends from an axially outer end region of the belt portion 5601 of the belt portion 5600 along a radially inner surface of an axially outer end region 5129 of a tread base layer 5120 to the electrically conductive rubber composition strip 5700, so as to provide an even more reliable electrically conductive pathway between the tread base layer 5120 and the electrically conductive rubber composition strip 5700.

Furthermore, the tire 5000 according to the embodiment of FIG. 5 comprises a tread portion 5100 comprising an electrically non-conductive tread cap layer 5110 and said electrically conductive tread base layer 5120. The tread base layer 5120 further comprises a radially outwards directed extension in form of the circumferential ring portion 5130, which extends to a radially outermost surface of the tread portion 5100 through the tread cap layer 5110, so as to provide an electrically conductive passage through the electrically non-conductive tread cap layer 5110. Again, the circumferential ring portion 5130 is provided along an equatorial plane EP of the tire, which is, however, not mandatory. For instance, the circumferential ring portion could also extend through another circumferential tread rib or row of tread blocks. Thus, the circumferential ring portion can also be provided at a different axial position in other embodiments. As in other embodiments, the tire 5000, comprises a pair of sidewalls 5200, a pair of bead portions 5400, and a carcass ply 5300 extending at least from bead portion 5400 to bead portion 5400. Each bead portion 5400 comprises a chafer 5420 and a bead 5410. Similar to the previous embodiment, the tire 5000, comprises a first apex 5051 provided radially above the bead 5410 and a second apex 5052, provided at a position radially above and axially outwards the bead 5410. It is noted that the second apex is not necessarily provided in alternative embodiments. A radially outer end region 5421 of the chafer 5420 overlaps with a radially inner end 5209 of the sidewall 5200 and with a radially inner end of the second apex 5052. The electrically conductive rubber composition strip 5700 extends with its radially inner end 5709 to a position which is radially below half of the total radial height of the chafer 5420. At its radially outer end 5701, the electrically conductive rubber composition strip 5700 contacts on its axially inner side or surface the axially outer end region 5129 of the electrically conductive tread base layer 5120. An axially outer surface or side of the rubber composition strip 5700, and particularly its radially outer end 5701, is covered by the sidewall 5200. A radially outer end 5201 of the sidewall 5200 extends radially outwards beyond the strip end 5701 so as to cover the axially outer end region 5129 of the tread base layer 5120, and preferably also a portion of an axially outer end region of the tread cap layer 5110. The tire 5000 is again provided with an SOT construction.

Still according to the embodiment of FIG. 5, the second electrically conductive rubber composition strip 5800 has a strip length extending from its first strip end 5801 adjacent an axially outer end region of the belt portion 5601, along a radially inner surface of the axially outer region 5129 of the tread base layer 5120, and further along an axially inner surface of the (first) electrically conductive rubber composition strip 5700 directed to the second strip end 5802, which is provided radially below the radially outer strip end 5701 of the (first) electrically conductive rubber composition strip 5700. Again, the provision of two strips 5700, 5800 increases the reliability of electrical charge conduction, even in case of potential slight tire building variances.

Figure 6:
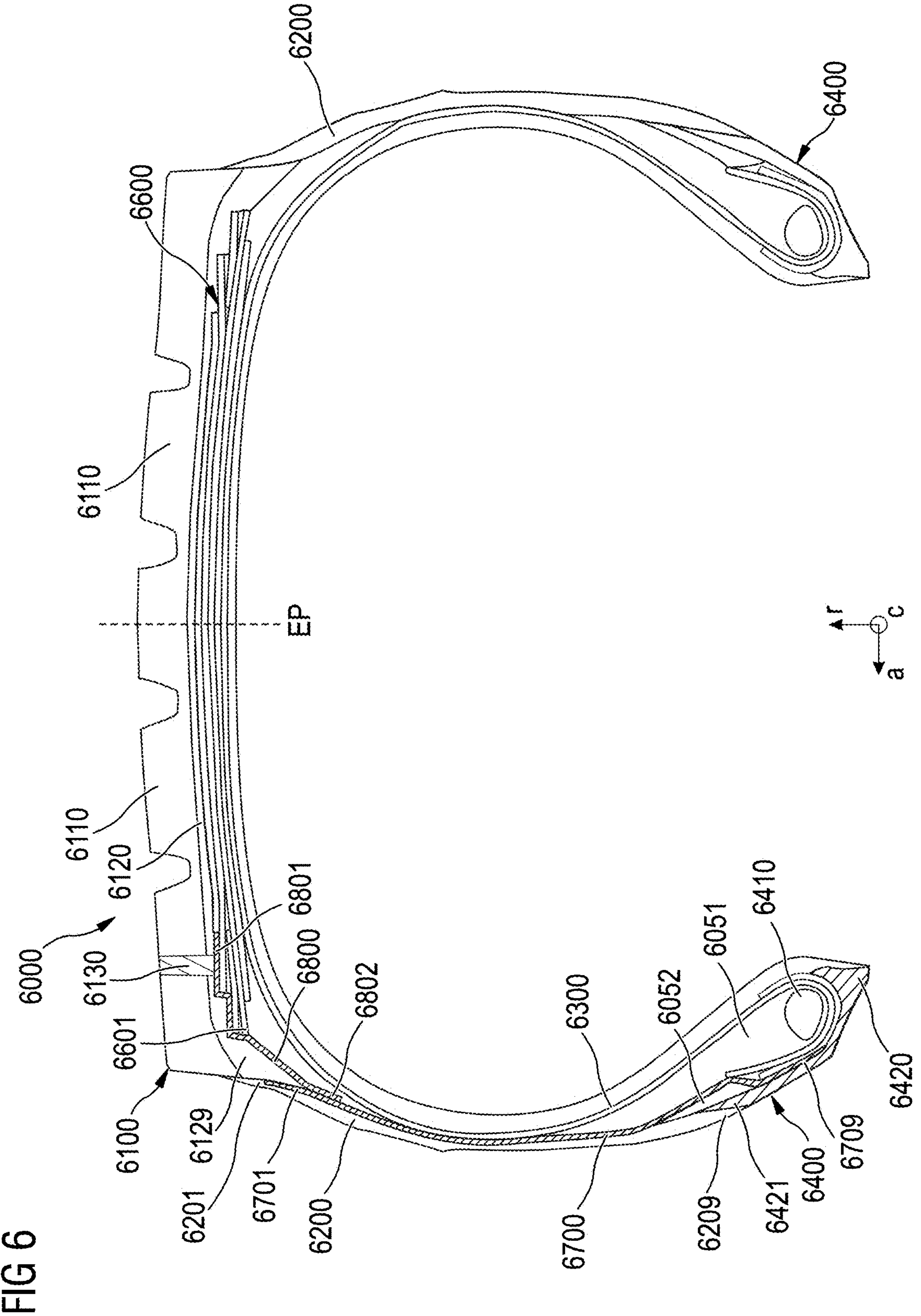
FIG. 6 is a schematic partial cross-section of a tire in accordance with still another embodiment of the present invention, which is similar to the embodiment of FIG. 3, but wherein a radially inner end of the respective first electrically conductive rubber composition strip is provided on an axially inner side of the respective chafer in an axially outer region of the bead portion.

FIG. 6 provides another schematic cross-section of a tire 6000 which comprises a rubber composition strip 6700 having essentially the same extension as the rubber composition strips 4700 and 5700 according to the embodiments of FIG. 4 and FIG. 5. In addition, a further rubber composition strip 6800 and a circumferential ring portion 6130 of the tire 6000 are provided as already accordingly described for the rubber composition strip 3800 and the circumferential ring portion 3130 of tire 3000 according to the embodiment of FIG. 3. Respective effects of such previously described arrangements apply also to the embodiment of FIG. 6 and are not reiterated herein for the sake of conciseness. Referring again to FIG. 6, the tire 6000 comprises a tread portion 6100 comprising an electrically non-conductive tread cap layer 6110, an electrically non-conductive tread base layer 6120, a pair of electrically non-conductive sidewalls 6200, a pair of bead portions 6400, an electrically non-conductive carcass ply 6300, a belt portion 6600, a pair of chafers 6420, a pair of beads 6410, a pair of first bead apexes 6051, and a pair of second apexes 6052. The sidewall 6200 shown on the left-hand side of FIG. 6 has the radially inner end 6209 and a radially outer end 6201, and the electrically non-conductive rubber composition strip 6700 comprises the radially outer end 6701 and the radially inner end 6709. The adjacent chafer 6420 has an axially and radially outer end region 6421. Said electrically conductive rubber composition strip 6800 extends from its first axially inner and/or radially outer end 6801 to its second axially outer and/or radially inner end 6802, passing an axially outer end region 6601 of the belt region 6600 and/or an axially outer end region 6129 of the tread base layer 6120. The effects of the both electrically conductive rubber composition strips 6700, 6800, and their respective arrangements are equivalent to those of said corresponding previously mentioned embodiments.

Figure 7:
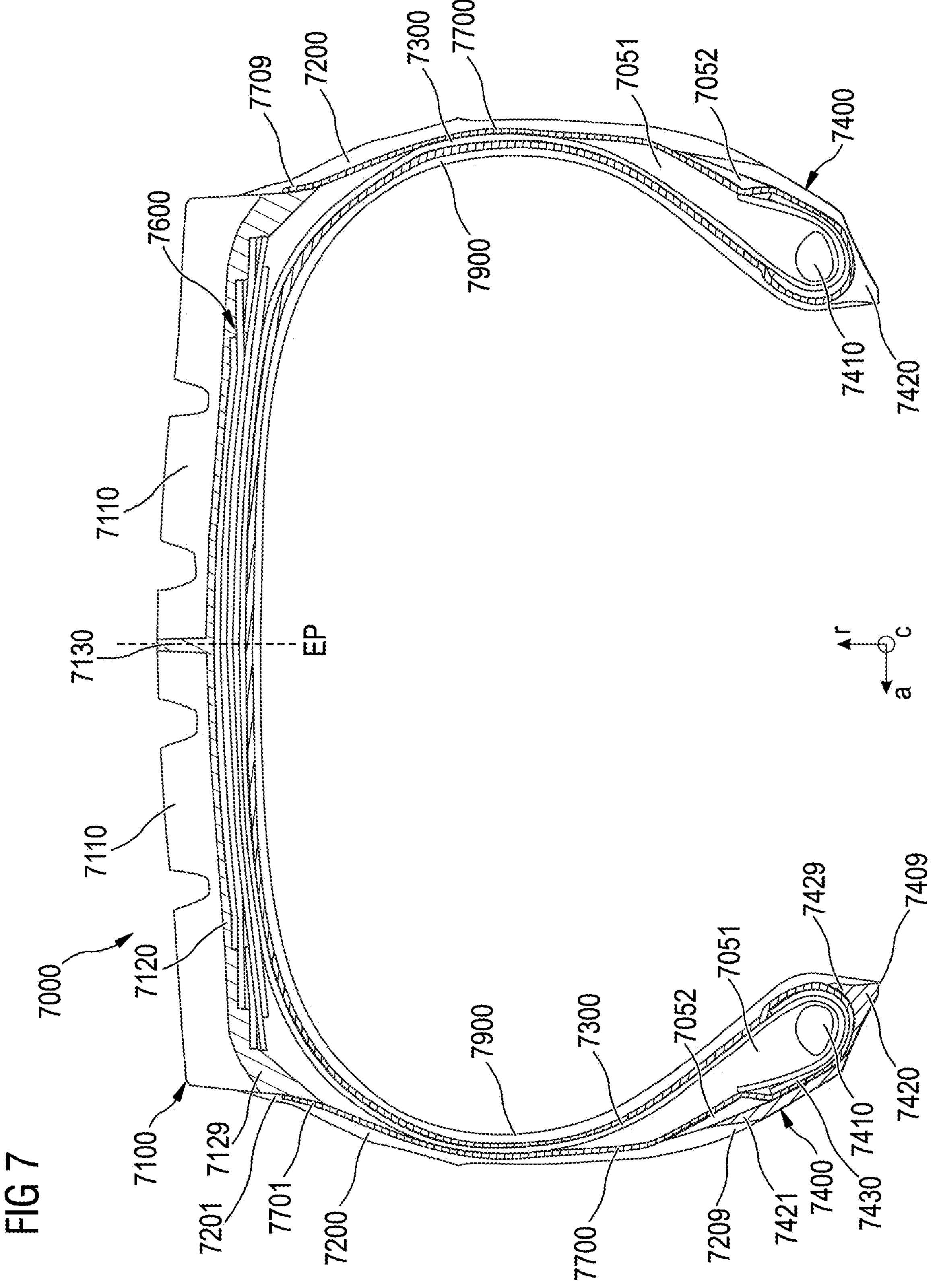
FIG. 7 is a schematic partial cross-section of a tire in accordance with still another embodiment of the present invention, in which an electrically conductive rubber composition strip extends from an axially outer region of a conductive base layer radially inwards and around a bead, and further below (and/or covered by) an innerliner of the tire to an axially opposite lateral side of the tire, around a laterally opposite bead and further radially outwards to an axially outer region of the conductive base layer.

FIG. 7 shows another schematic cross-section according to still another embodiment of a tire 7000, in which an electrically conductive rubber composition strip 7700 extends from one lateral side of the tire 7000 to an opposite lateral side of the tire 7000. Apart from the strip 7000, the remaining tire components are equivalent to those described in the embodiment of FIG. 4.

Referring again to FIG. 7, the tire 7000 comprises a tread portion 7100 comprising an electrically non-conductive tread cap layer 7110, an electrically conductive tread base layer 7120 having a radially outwards extending ring portion 7130, here again along an equatorial plane EP of the tire 7000. A belt portion 7600 is provided radially below the tread portion 7100, and the tire 7000 comprises a pair of electrically non-conductive sidewalls 7200, a pair of bead portions 7400, an electrically non-conductive carcass ply 7300, extending from bead portion 7400 to bead portion 7400. Each bead portion 7400 has a bead 7410 and a chafer 7420. It is noted that both chafers 7420 do not need to have the same rubber compositions. In particular, it is possible that only one of the chafers 7420 comprises an electrically conductive rubber composition, which is sufficient to provide an electrical pathway from a rim into and through the tire. The same applies to other embodiments mentioned herein, provided that at least one chafer, which is adjacent and/or in contact with an electrically conductive rubber composition strip and/or layer, is an electrically conductive chafer. Describing a preferred extension of the electrically conductive rubber composition strip 7700, starting at a radially outer strip end 7701 (as on the left-hand side of FIG. 7), the electrically conductive rubber composition strip 7700 extends from its strip end 7701, which is in contact with an axially outer surface of an axially outer end region 7129 of the electrically conductive tread base layer 7120 and/or provided at an axially inner side of the sidewall 7200, in a radially inwards direction. The electrically conductive rubber composition strip 7700 extends along an axially inner side or surface of the sidewall 7200, further along an axially inner side or surface of the second apex 7052, further along an axially inner side or surface of the radially outer end region 7421 of the chafer 7420, further around the bead 7410, and/or the carcass ply 7300 which is folded around the bead 7410. In other words, the electrically conductive rubber composition strip 7700 extends essentially with a U-shaped path around the bead 7410 in the bead portion 7400. Alternatively, or in addition, the extension of the electrically conductive rubber composition strip 7700 can also be described as folded around the bead 7410 and/or the carcass ply 7300 in the bead portion 7400. Radially inwards the bead 7410, the electrically conductive rubber composition strip 7000 extends between the carcass ply 7300 and the chafer 7420. As further shown in FIG. 7, the tire 7000 and/or one or both bead portions 7400 optionally comprise a chipper 7430. For instance, such a chipper 7430 can be provided between the carcass ply 7300 (folded around the bead 7410) and the electrically conductive rubber composition strip 7700 in the bead portion 7400. In other embodiments, a chipper can be provided between carcass ply and chafer. For example, a chipper can be considered as folded around the bead along the carcass ply. Referring again to FIG. 7, at an axially inner end region 7429 of the chafer 7420, which is radially outwards a radially innermost tip 7409 of the bead portion 7400, the electrically conductive rubber composition strip 7700 further extends below an innerliner 7900 of the tire 7000 which at least partially encloses a tire cavity of the tire 7000. Thus, the electrically conductive rubber composition strip 7700 continues to extend between the innerliner 7900 and the carcass ply 7300 towards a crown region of the tire 7000, further extending essentially in parallel to the belt portion 7600 (still between the carcass ply 7300 and the innerliner 7900), and then again essentially radially inwards to a laterally opposite bead portion 7400 (on the right-hand side of FIG. 7), where the electrically conductive rubber composition strip 7700 is folded again around the respective bead 7410 of the respective bead portion 7400, between the carcass ply 7300 (and/or optional chipper) and the respective chafer 7420 of the pair of chafers 7420. Then the electrically conductive rubber composition strip 7700 extends again radially outwards, particularly along an axially inner surface of the chafer 7420, an axially inner surface of the second apex 7052, and axially outer surface of the first apex 7051, along an axially inner surface of the sidewall 7200 towards its second axially outer end 7709 provided at and/or in contact with a respective axially outer surface of the tread base layer 7120 (still on the right-hand side of FIG. 7), covered by the sidewall 7200. Thus, for example, in contrast to the embodiment of FIG. 4, the electrically conductive rubber composition strip 7700 further extends from a position axially between the chafer 7420 and the bead 7410, on a first lateral side of the tire (e.g., the left-hand side of FIG. 7), further around the bead 7410 and/or the carcass ply 7300 at the first lateral side of the tire 7000, below and innerliner

7900 towards the opposite/second lateral side of the tire 7000 (e.g., on the right-hand side of FIG. 7). On said first lateral side of the tire 7000, the sidewall 7200 covers the radially outer end 7701 of the electrically conductive rubber composition strip 7700 and covers with its radially outer end 7201 the axially outer end region 7129 of the axially adjacent tread base layer 7120. At a radially inner end 7209, the first sidewall 7200 covers an axially and/or radially outer tip of the second apex 7052 as well as an axially and/or radially outer end 7421 of the chafer 7420.

Thus, the embodiment of FIG. 7 provides electrical pathways on both lateral sides of the tire 7000, thereby improving again the liability of electrical charge conduction, such as despite potential tire building variances and/or occurring tire damages such as sidewall cuts, which may appear during tire use.

Figure 8:
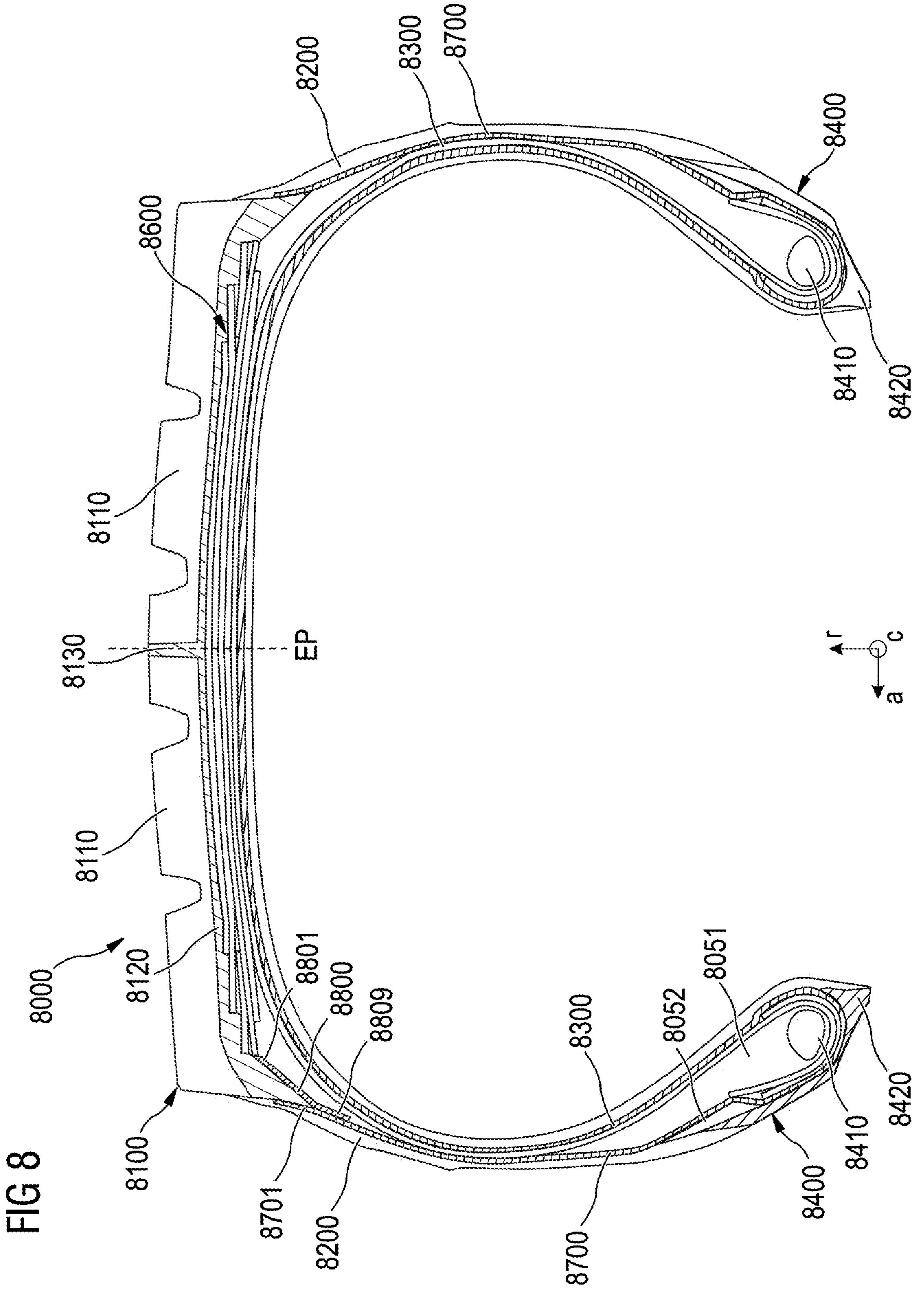
FIG. 8 is a schematic partial cross-section of a tire in accordance with still another embodiment of the present invention, which has an electrically conductive rubber composition strip as already shown in FIG. 7, and in addition, a second electrically conductive rubber composition strip, which extends from an axially outer end region of the belt towards an adjacent end region of the electrically conductive rubber composition strip which extends from one lateral side of the tire to an opposite lateral side of the tire.

FIG. 8 shows another cross-section of a pneumatic tire 8000, in accordance with still another embodiment of the present invention, wherein a first electrically conductive rubber composition strip 8700 corresponds essentially to the electrically conductive rubber composition strip 7700 shown in FIG. 7. In addition to such a first rubber composition strip 8700, the tire 8000 comprises a second electrically conductive rubber composition strip 8800 which corresponds essentially to the second electrically conductive rubber composition strips 2800, 5800 already disclosed with respect to FIGS. 2 and 5, with equivalent effects. In this context, it is noted that the tire 8000, or tires according to other embodiments disclosed herein, may comprise a third electrically conductive rubber composition strip, which is equivalent/equal to the electrically conductive rubber composition strip 8800 but is additionally provided at a laterally opposite side of the tire.

Still with reference to FIG. 8, the tire 8000 comprises, as respectively described in relation to other embodiments mentioned herein above, a (circumferential) tread portion 8100 having an electrically non-conductive (circumferential) tread cap layer 8110 and an electrically conductive (circumferential) tread base layer 8120 and a circumferential ring portion 8130, a (circumferential) belt portion 8600, an electrically non-conductive (circumferential) carcass ply 8300, a pair of (circumferential) bead portions 8400 having (circumferential) beads 8410 and (circumferential) chafers 8420, a pair of electrically non-conductive (circumferential) first bead apexes 8051, a pair of electrically non-conductive (circumferential) second apexes 8052, a pair of electrically non-conductive sidewalls 8200. The electrically conductive second rubber composition strip 8800 (having a strip width extending along the circumferential direction, which is typically less than 8 cm, preferably less than 5 cm) extends from its first strip end 8801 radially below and in contact with the tread base layer 8120 towards its second strip end 8809 which is in contact with an axially inner side of the first electrically conductive rubber composition strip 8700 at a position radially below the tread base layer 8120 and at a radially outer end region or end 8701 of the first electrically conductive rubber composition strip 8700.

Figure 9:
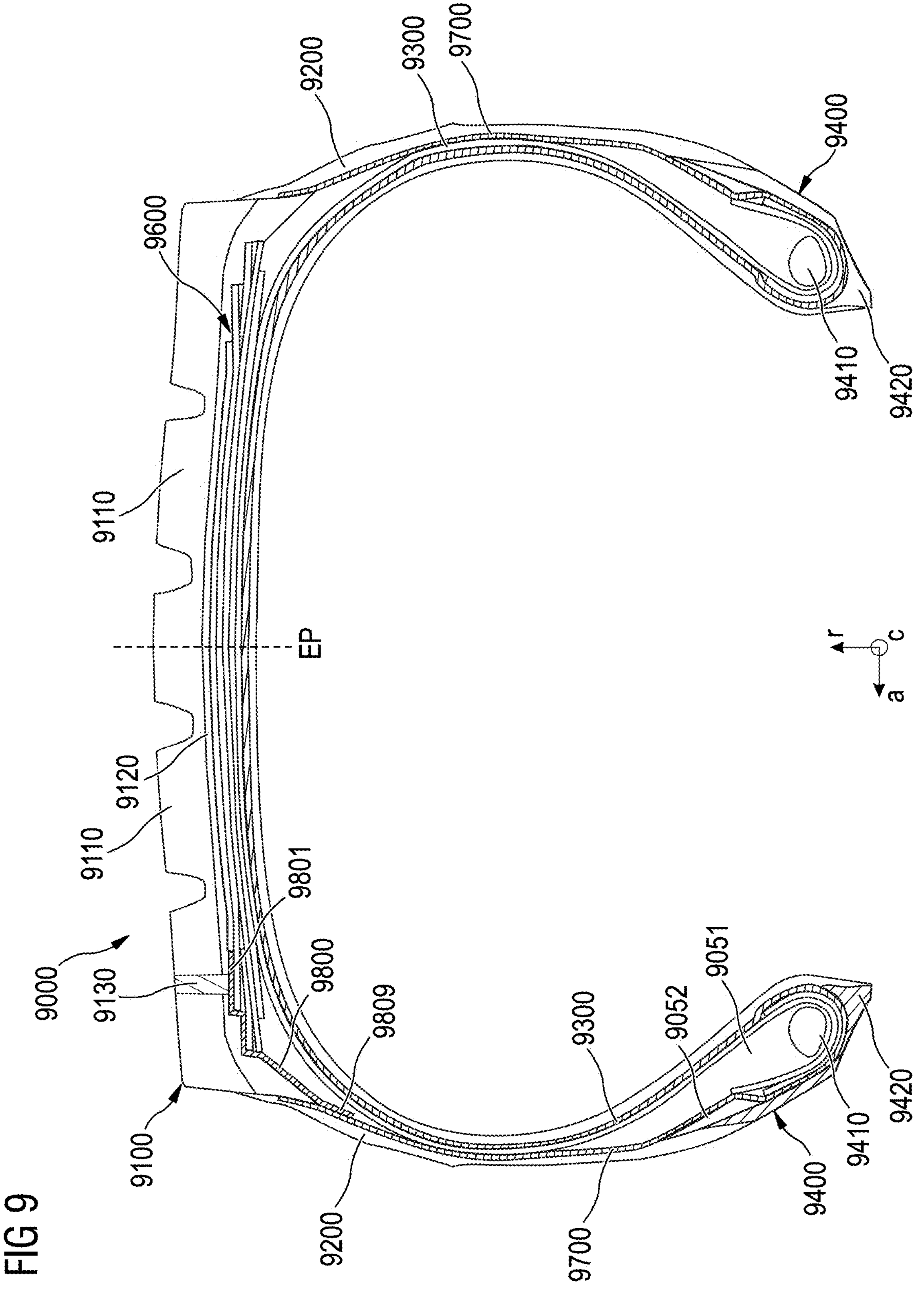
FIG. 9 is a schematic partial cross-section of a tire in accordance with still another embodiment of the present invention, comprising the electrically conductive rubber composition strip as shown in FIG. 7, and additionally, a tread portion with an electrically conductive circumferential ring portion which is electrically connected to said electrically conductive rubber composition strip via a second electrically conductive rubber composition strip which extends from a radially inner edge/surface of the electrically conductive circumferential ring portion to said electrically conductive rubber composition strip.

FIG. 9 discloses still another schematic cross-section of a pneumatic tire 9000 in accordance with still another embodiment of the present invention. This tire 9000 comprises the same first electrically conductive rubber composition strip 9700 as described as said first electrically conductive rubber composition strips 7700, 8700 in the embodiments of FIGS. 7 and 8. In addition, the tire 9000 of FIG. 9 comprises a second electrically conductive rubber composition strip 9800 which is equivalent to the electrically conductive rubber composition strips 3800, 6800 as described in relation to FIGS. 3 and 6. The same applies to the electrically conductive circumferential ring portion 9130 of tire 9000, which corresponds to the electrically conductive circumferential ring portions 3130 and 6130 according to FIGS. 3 and 6.

Still with reference to FIG. 9, the tire 9000 comprises, as respectively described in relation to other embodiments herein, the (circumferential) tread portion 9100 having an electrically non-conductive (circumferential) tread cap layer 9110 and an electrically non-conductive (circumferential) tread base layer 9120, a (circumferential) belt portion 9600, an electrically non-conductive (circumferential) carcass ply 9300, a pair of (circumferential) bead portions 9400 having (circumferential) beads 9410 and (circumferential) chafers 9420, a pair of electrically non-conductive (circumferential) first bead apexes 9051, a pair of electrically non-conductive (circumferential) second apexes 9052, and a pair of electrically non-conductive sidewalls 9200. The electrically conductive second rubber composition strip 9800 (having a strip width extending along the circumferential direction) extends from its first strip end 9801 radially below and in contact with the radially inner end of the electrically conductive ring portion 9130 towards its second strip end 9809 which is in contact with an axially inner side of the electrically conductive rubber composition strip 9700 at a position radially below the tread base layer 9120.

Figure 10:
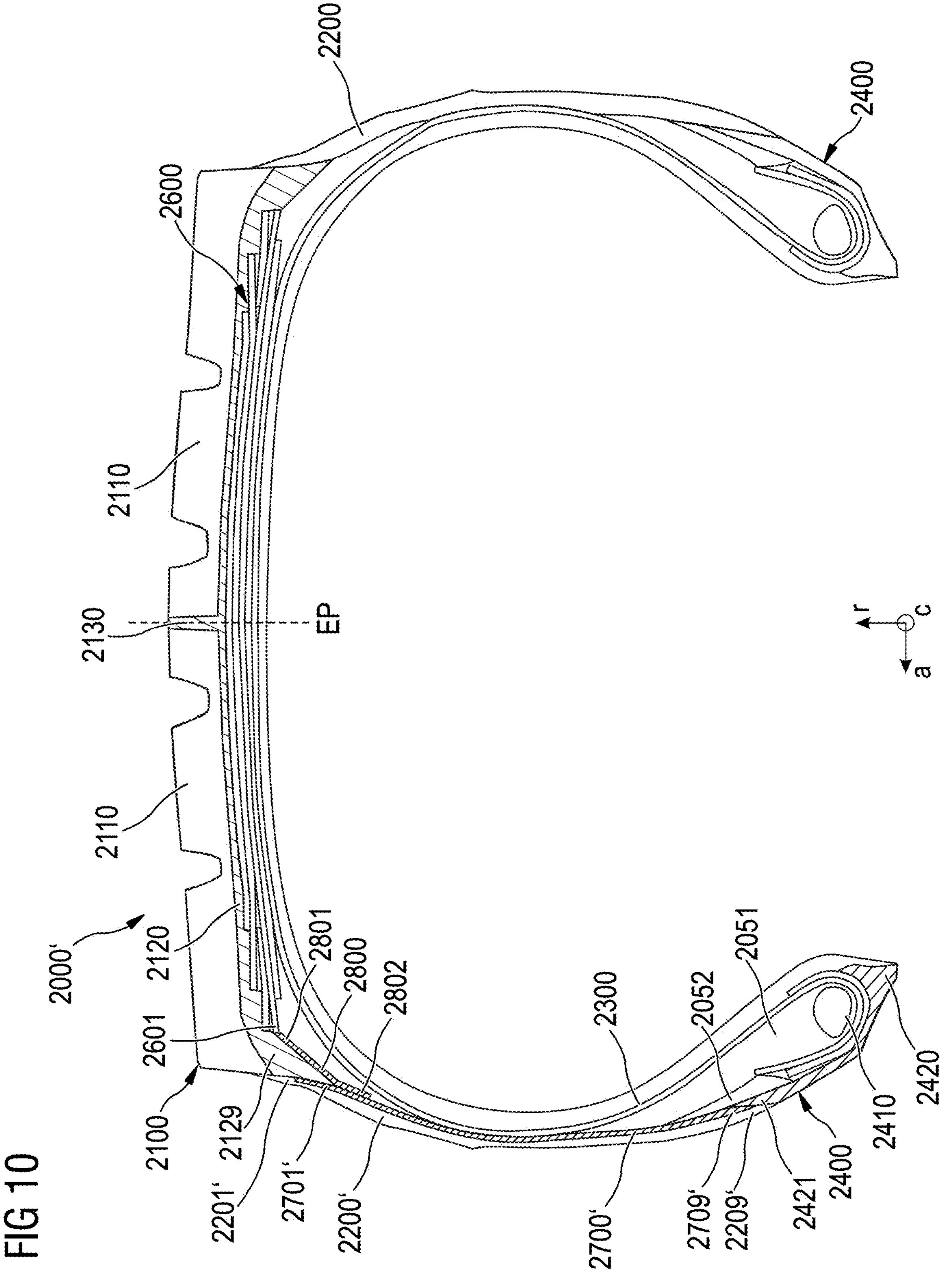
FIG. 10 is a schematic partial cross section of a tire in accordance with still another embodiment of the present invention, comprising a circumferential electrically conductive sidewall layer provided on a radially inner side of one of the sidewalls, and further comprising an electrically conductive rubber composition strip extending from a radially inner side and axially outer end region of the tread base layer to the circumferential electrically conductive sidewall layer.

FIG. 10 shows a schematic cross-section of a tire 2000' in accordance with still another embodiment of the present invention. Tire 2000' is similar to the tire 2000 according to FIG. 2 but comprises instead of the first electrically conductive rubber composition strip 2700, a circumferential and electrically conductive rubber composition layer 2700' (or, in other words, a circumferential and electrically conductive rubber composition sidewall layer). Thus, the layer 2700' according to FIG. 10 extends by 360° along the circumferential direction, whereas said strip 2700 of FIG. 2 extends only with its strip width along the circumferential direction which is much narrower than the full circumferential extension of the circumferential layer 2700 according to FIG. 10. Equal reference signs are provided in FIG. 10 and FIG. 2 where applicable. In particular, the embodiment of FIG. 10 allows a co-extrusion of the (preferably electrically non-conductive) sidewall 2200' together with the circumferential electrically conductive rubber composition layer 2700'.

Still referring to FIG. 10, the circumferential electrically conductive rubber composition layer 2700' extends from its first and/or radially outer (circumferential) edge 2701', which is arranged axially between i) the axially outer end region 2129 of the electrically conductive tread base layer 2120 and ii) a radially outer end 2201' (of a radially outer end region) of the sidewall 2200', along the sidewall 2200', in a radially inner direction, to its second and/or radially inner (circumferential) edge 2709', which is axially between a) a radially inner end 2209' of the sidewall 2200' and a radially outer end region 2421 of the adjacent chafer 2420. In particular, the first and/or radially outer (circumferential) edge 2701' is in contact with the electrically conductive tread base layer 2120 of the tread portion 2100, and the second circumferential edge 2709' is in contact with the electrically conductive chafer 2420, which provides an electrical pathway from a rim, to which the tire 2000' can be mounted (not shown in FIG. 10), to the tread portion 2100. The electrically conductive tread base layer 2120 has the radially outward extending circumferential ring portion 2130 (or, in other words, electrically conductive chimney), which extends up to a radially outermost surface of the tread portion 2100, which is in contact with the ground, particularly a road, when driving.

As in the embodiment of FIG. 2, the embodiment of FIG. 10 comprises also a rubber composition strip 2800 having a first strip end 2801 and a second strip end 2802, wherein a width of the strip 2800 extends in the circumferential direction. In particular, in the present and preferred embodiment, the electrically conductive rubber composition strip 2800 is not replaced by a circumferential layer extending along the whole circumference of the tire 2000'. The electrically conductive rubber composition strip 2800 mainly serves as a backup path in case the circumferential sidewall layer 2701' did not contact the tread base layer 2120.

Figure 11:
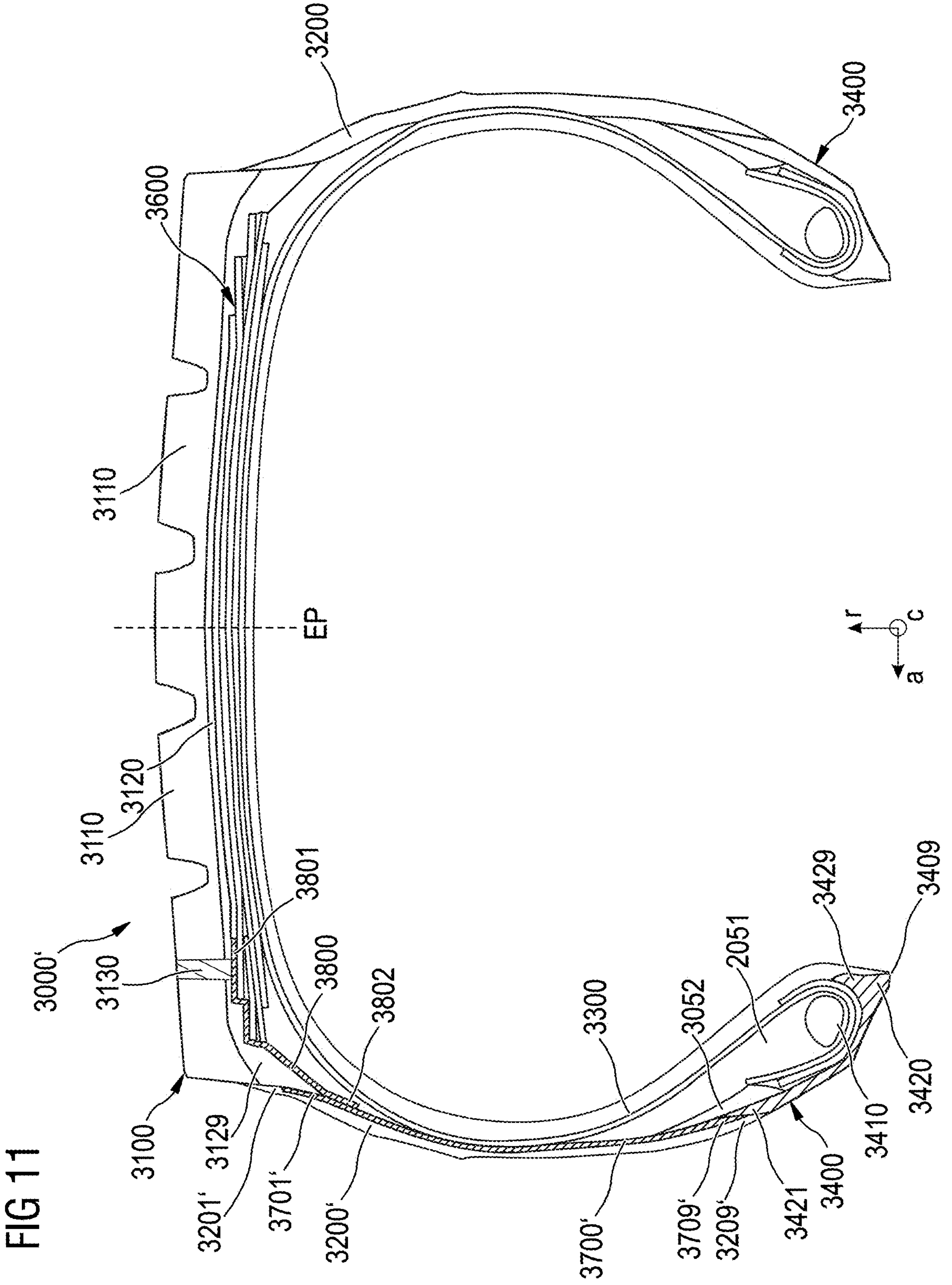
FIG. 11 is a schematic partial cross section of a tire in accordance with still another embodiment of the present invention, comprising a circumferential electrically conductive sidewall layer provided on a radially inner side of one of the sidewalls, and further comprising an electrically conductive rubber composition strip extending from a radially inner side/surface of a circumferential ring portion of the tread portion to the electrically conductive sidewall layer.

FIG. 11 shows a schematic cross-section of a tire 3000' in accordance with still another embodiment of the present invention. Tire 3000' is similar to the tire 3000 according to FIG. 3 but comprises instead of the electrically conductive rubber composition strip 3700, a circumferential and electrically conductive rubber composition layer 3700' (or, in other words, a circumferential and electrically conductive rubber composition sidewall layer). Thus, said layer 3700' according to FIG. 11 also extends by 360° along the circumferential direction, whereas the strip 3700 of FIG. 3 extends only with its strip width along the circumferential direction which is much narrower than the circumferential extension of the circumferential layer 3700' according to FIG. 11. Equal reference signs are provided in FIG. 11 and FIG. 3 where applicable. Similar to and as already indicated for the embodiment of FIG. 10, the embodiment of FIG. 11 allows co-extrusion of the (preferably electrically non-conductive) sidewall 3200' together with the circumferential electrically conductive rubber composition layer 3700'.

Referring again to FIG. 11, the circumferential electrically conductive rubber composition layer 3700', which can also be described as annular rubber composition layer, extends from its first and/or radially outer (circumferential) edge 3701', which is arranged axially between i) the axially outer end region 3129 of the electrically conductive tread base layer 3120 and ii) a radially outer end 3201' of the sidewall 3200', along the sidewall 3200', in a radially inner direction, to its second and/or radially inner (circumferential) edge 3709', which is axially between a) a radially inner end 3209' of the sidewall 3200' and a radially outer end region 3421 of the adjacent chafer 3420. In particular, the first and/or radially outer (circumferential) edge 3701' is in contact with the electrically conductive tread base layer 3120 of the tread portion 3100, and the second circumferential edge 3709' is in contact with the electrically conductive chafer 3420, which provides an electrical pathway from a rim, to which the tire 3000' may be mounted (not shown in FIG. 11), to the electrically conductive tread base layer 3120, which comprises the radially outwards extending circumferential ring portion 3130, which extends to a radially outermost surface of the tread portion 3100 contacting the ground, particularly a road, when driving.

As in the embodiment of FIG. 3, the embodiment of FIG. 11 comprises also a further rubber composition strip 3800 having a first strip end region with the first strip end 3801 and a second strip end 3802, wherein a width of the strip 3800 extends in the circumferential direction. In this embodiment, the electrically conductive rubber composition strip 3800 provides an electrical pathway from a radially outer end region of the first circumferential and electrically conductive rubber composition layer 3700' to the electrically conductive circumferential ring portion 3130. In other words, the radially inner end/second end 3802 contacts the circumferential electrically conductive rubber composition layer 3700' and the first end region contacts a radially inner end of the electrically conductive circumferential ring portion 3130. In the present embodiment, the tread base layer 3120 is electrically non-conductive. The same applies to the tread cap layer 3110. The circumferential ring portion 3130 extends radially through the tread portion 3100, i.e. from a radially outermost surface of the tread cap layer 3110 to a radially innermost surface of the tread base layer 3120.

Rubber compositions for tires and/or their components are considered as being known in the art. For instance, in still another embodiment, a rubber composition may include at least one or more, and/or one or more additional diene-based rubbers, such as one or more of styrene butadiene rubber, natural rubber, synthetic polyisoprene, and polybutadiene rubber. In one embodiment, a synthetic or natural polyisoprene rubber may be used. Synthetic cis-1,4-polyisoprene and natural rubber are as such well known to those having skill in the rubber art. In particular, the cis 1,4-microstructure content may be at least 90% and is typically at least 95% or even higher. In one embodiment, cis-1,4-polybutadiene rubber is used.

The term "phr" as used herein, and according to conventional practice, refers to "parts by weight of a respective material per 100 parts by weight of rubber, or elastomer". In general, using this convention, a rubber composition is comprised of 100 parts by weight of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. The terms "compound" and "composition" are used herein interchangeably, unless indicated otherwise.

In another embodiment, a rubber composition includes from 1 phr to 80 phr, or from 5 phr to 80 phr, of a resin, preferably having a glass transition temperature (Tg) greater than 20° C. A Tg for resins is determined as a peak midpoint by a differential scanning calorimeter (DSC) at a temperature rate of increase of 10° C. per minute, according to ASTM D6604 or equivalent. Preferably, the resin has a softening point above 70° C. as determined by ASTM E28 which might sometimes be referred to as a ring and ball softening point. In one embodiment, the rubber composition includes from 10 phr to 60 phr or from 20 phr to 60 phr or from 30 phr to 60 phr of resin, particularly if the rubber composition is a tread cap rubber composition.

In another embodiment, the resin is selected from the group consisting of coumarone-indene resin, petroleum hydrocarbon resin, terpene polymers/resins, styrene/alphamethylstyrene resins, terpene phenol resin, rosin derived resins and copolymers and/or mixtures thereof.

In another embodiment, a rubber composition comprises oil, such as processing oil. Oil may be included in the rubber composition as extending oil typically used to extend elastomers. Oil may also be included in the rubber composition by addition of the oil directly during rubber compounding. If used, the rubber composition may also include up to 40 phr of processing oil, preferably between 1 phr and 25 phr. Alternatively less than 10 phr of oil, preferably less than 5 phr of oil are provided.

In an embodiment, a rubber composition comprises silica. Silica may be for instance pyrogenic/fumed or precipitated silica. In preferred embodiments, precipitated silica is used. Silicas might be characterized, for example, by having a BET surface area, as measured using nitrogen gas. In one embodiment, the BET surface area may be in the range of 40 to 600 square meters per gram. In another embodiment, the BET surface area may be in a range of 50 to 300 square meters per gram. The BET surface area is determined according to ASTM D6556 or equivalent and is described in the Journal of the American Chemical Society, Volume 60, Page 304 (1930). Silica may also be characterized by having a dibutylphthalate (DBP) absorption value in a range of 100 $cm^3$/100 g to 400 $cm^3$/100 g, alternatively 150 $cm^3$/100 g to 300 $cm^3$/100 g which is determined according to ASTM D 2414 or equivalent. Silica may have an average ultimate particle size, for example, in the range of 0.01 to 0.05 micron as determined by an electron microscope, although the silica particles may be even smaller, or possibly larger, in size. Optionally, ranges of silica use could be for instance between 1 phr and 150 phr, preferably in a range of 10 phr to 70 phr herein. Various commercially available silicas may be used, such as, only for example herein, and without limitation, silicas commercially available from PPG Industries under the Hi-Sil trademark with designations 210, 315G, EZ160G, etc; silicas available from Solvay, with, for example, designations of Z1165MP and Premium200MP, etc.; and silicas available from Evonik AG with, for example, designations VN2 and Ultrasil™ 6000GR, 9100GR, etc.

In another embodiment, a rubber composition includes carbon black. Representative examples of such carbon blacks include, for instance, N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades.

In another embodiment, a rubber composition may contain sulfur containing organosilicon compounds or silanes. The amount of such a compound may typically range from 0.5 phr to 20 phr, particularly in the case of tread rubber compositions. In one embodiment, the amount will range from 1 phr to 10 phr.

It is readily understood by those having skill in the art that a rubber composition may be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above can be selected and commonly used in conventional amounts. Some representative examples of sulfur donors include elemental sulfur (free sulfur), an amine disulfide, polymeric polysulfide and sulfur olefin adducts. In one embodiment, a sulfur-vulcanizing agent is elemental sulfur. The sulfur-vulcanizing agent may for instance be used in an amount ranging from 0.5 phr to 8 phr, such as within a range of 1.5 phr to 6 phr. Typical amounts of tackifier resins, if used, comprise for example 0.5 phr to 10 phr, usually 1 phr to 5 phr. Typical amounts of processing aids, if used, comprise for example 1 phr to 50 phr (this may comprise in particular oil). Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, may for example comprise 1 phr to 5 phr. Often microcrystalline waxes are used. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate.

Mixing of a rubber composition can be accomplished by methods known to those having skill in the rubber mixing art.

Vulcanization of the pneumatic tire may for instance be carried out at conventional temperatures ranging from 100□C to 200□C. Any of the usual vulcanization processes may be used such as heating in a press or mold, heating with superheated steam or hot air. Such tires can be built, shaped, molded and cured by various methods which are known and will be readily apparent to those having skill in such art.

For instance, it is noted that the process of tire building, such as with a tire building drum is known in the art. Furthermore, further elements and/or tire components may be provided to a tire during a tire building process, such as but not limited to flippers, chippers, cushions, shoulder wedges, gum strips, further carcass plies, further belt plies, and one or more overlays, or overlay ply strips.

While a person skilled in the art of rubber compositions for tires, typically knows how to prepare electrically conductive or electrically non-conductive rubber compositions for various tire applications and/or tire components, some preferred embodiments for such compositions are provided herein below.

As one non-limiting example, an electrically conductive rubber composition strip/layer, and/or a chafer, comprises a rubber composition comprising 25 phr natural rubber, 75 phr polybutadiene, 70 phr of carbon black, 14 phr of oil, 2 phr of stearic acid, 7 phr of antidegradants, 2.5 phr of zinc oxide, 2 phr of sulfur, and 1.7 phr of accelerator. The electrical volume resistivity of this rubber composition has been determined as being below 1×105 ohm·cm. Moreover, an indicator for the hysteresis of the compound has been determined, i.e., with a tangent delta at 10% strain which is about 0.19. Tangent delta is determined herein with an RPA 2000™ Rubber Process Analyzer of the company Alpha Technologies, based on ASTM D5289 or equivalent.

Other non-limiting embodiments of rubber compositions for an electrically conductive rubber composition strip/layer and/or a chafer can include from 20 phr to 50 phr of natural rubber and/or synthetic polyisoprene, from 50 phr to 80 phr of polybutadiene rubber, from 50 phr to 90 phr (preferably from 60 phr or 65 phr to 85 phr or 80 phr) of carbon black. Optionally, such a composition further comprises one or more of: from 0.5 phr to 25 phr of oil, from 2 phr to 15 phr of antidegradants (preferably from 6 phr to 10 phr of antidegradants), from 0.5 phr to 5 phr of one or more tackifiers (such as phenolic resins), from 0.5 phr to 5 phr of stearic acid, from 0.5 phr to 10 phr (preferably to 5 phr) of zinc oxide, from 0.5 phr to 8 phr (preferably to 5 phr) of sulfur, and from 0.5 phr to 4 phr of one or more vulcanization accelerators.

Still another non-limiting example of a rubber composition for an electrically conductive strip/layer can comprise from 80 phr to 100 phr of natural rubber and/or synthetic polyisoprene, from 0 phr to 20 phr of one or more diene-based elastomers, such as chosen from one or more of polybutadiene rubber and styrene-butadiene rubber, from 40 phr to 80 phr of carbon black, from 0 phr to 20 phr of silica, from 0 phr to 20 phr of oil, from 0 phr to 4 phr of stearic acid, from 0.5 phr to 10 phr of antidegradants, from 0 phr to 10 phr (preferably to 5 phr) of zinc oxide, from 0.5 phr to 10 phr (preferably to 5 phr) of sulfur, and from 0.5 phr to 5 phr of one or more accelerators.

In still another non-limiting example of a rubber composition for an electrically conductive chafer, the rubber composition comprises from 10 phr to 40 phr of one or more of natural rubber and synthetic polyisoprene, from 60 phr to 90 phr of polybutadiene, from 50 phr (preferably from 60 phr) to 80 phr of carbon black, and less than 20 phr (preferably less than 10 phr) of oil. In addition, the rubber composition can comprise one or more of from 0 phr to 10 phr of silica, from 0 phr to 10 phr of oil, from 0 phr to 4 phr of stearic acid, from 0.5 phr to 10 phr of antidegradants, from 0 phr to 10 phr (preferably to 5 phr) of zinc oxide, from 0.5 phr to 10 phr (preferably to 5 phr) of sulfur, and from 0.5 phr to 5 phr of one or more accelerators.

In still another non-limiting example, a rubber composition for an electrically conductive tread base layer, and/or an electrically conductive ring portion, comprises from 80 phr to 100 phr of one or more of natural rubber and synthetic polyisoprene, from 0 phr to 20 phr of one or more of polybutadiene and styrene-butadiene rubber, from 40 phr to 60 phr of carbon black, and from 0 phr to 15 phr of oil. In addition, the rubber composition can comprise one or more of from 0 phr to 10 phr of silica, from 0 phr to 4 phr of stearic acid, from 0.5 phr to 10 phr of antidegradants, from 0 phr to 10 phr (preferably to 5 phr) of zinc oxide, from 0.5 phr to 10 phr (preferably to 5 phr) of sulfur, and from 0.5 phr to 5 phr of one or more accelerators.

In still another non-limiting example, one or more of an electrically conductive tread base layer, and/or a circumferential electrically conductive ring portion, comprises a rubber composition comprising 30 phr of polybutadiene rubber, 40 phr of polyisoprene, 30 phr of styrene butadiene rubber, 70 phr of carbon black, 31 phr of oil, 5 phr of a phenolic resin, 3.8 phr of waxes, 6.7 phr of antidegradants (here including phenylene diamine types), 1 phr of stearic acid, 0.9 phr of accelerators, 2 phr of zinc oxide and 2.5 phr of sulfur.

In another embodiment, an electrically non-conductive sidewall and/or chafer rubber composition may comprise from 20 to 50 phr of natural rubber or synthetic polyisoprene, from 50 to 80 phr of polybutadiene rubber, from 0.1 phr to 45 phr (preferably from 0.1 phr to 40 phr or to 35 phr) of carbon black. Optionally, such a composition further comprises one or more of from 1 phr to 10 phr of oil, from 3 phr to 15 phr of antidegradants (preferably from 6 phr to 10 phr of antidegradants), from 0.5 phr to 5 phr of one or more tackifiers (such as phenolic resins), from 0.5 phr to 5 phr of stearic acid, from 0.5 phr to 5 phr of zinc oxide, from 0.5 phr to 5 phr of sulfur, and from 0.5 phr to 4 phr of one or more vulcanization accelerators.

Further electrically non-conductive rubber compositions, such as tread cap layer or tread base layer rubber compositions, are also known in the art and typically comprise less than 20 phr of carbon black, preferably less than 10 phr of carbon black, or even less than 5 phr of carbon black. In addition, or alternatively, such compositions comprise more than 10 phr of silica, preferably more than 20 phr of silica, or even more than 30 phr of silica.

While some preferred rubber compositions have been provided herein above, other compositions are possible. In particular, in an option, one or more of the above compositions may comprise one or more further diene-based elastomers and/or rubbers such as up to 10 phr, preferably up to 5 phr. In addition, or alternatively, natural rubber may be replaced by synthetic polyisoprene and vice versa.

It is emphasized that multiple embodiments, and/or aspects, and/or features thereof can be combined with one another. Moreover, embodiments and/or features of one aspect can also be embodiments and/or features of another aspect of the invention. Merely for the sake of conciseness such combinations are not explicitly reiterated herein.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic tire comprising:

a pair of axially opposite bead portions, wherein each bead portion of the pair of bead portions comprises a bead and a chafer;

a tread portion;

at least one carcass ply extending at least from one bead portion of the pair of bead portions to an axially opposite bead portion of the pair of bead portions;

a belt portion arranged radially between the tread portion and the at least one carcass ply in a crown region of the tire;

a pair of axially opposite sidewalls, wherein each sidewall of the pair of axially opposite sidewalls extends from an axially outer end region of the tread portion and radially inwards to a respective one of the bead portions;

wherein the tread portion comprises at least one radially outer tread cap layer and at least one radially inner electrically conductive tread base layer; and wherein the tire further comprises:

an electrically conductive rubber composition strip having a first strip end, which is i) axially between the first sidewall and an adjacent axially outer surface of the tread base layer, and ii) radially below the tread cap layer, and wherein the electrically conductive rubber composition strip extends along an axially inner side of a first sidewall of the pair of sidewalls from the first strip end at least to a respective chafer of the respective one of the bead portions adjacent the first sidewall, wherein the respective chafer is an electrically conductive chafer, wherein the electrically conductive rubber composition strip further extends along the chafer, around the bead, and further along the carcass ply to an opposite lateral side of the tire, and at least around the bead of another one of the bead portions at the opposite lateral side of the tire.

2. A pneumatic tire comprising:

a pair of axially opposite bead portions, wherein each bead portion of the pair of bead portions comprises a bead, a first apex, a second apex and a chafer;

a tread portion;

at least one carcass ply extending at least from one bead portion of the pair of bead portions to an axially opposite bead portion of the pair of bead portions;

a belt portion arranged radially between the tread portion and the at least one carcass ply in a crown region of the tire;

a pair of axially opposite sidewalls, wherein each sidewall of the pair of axially opposite sidewalls extends from an axially outer end region of the tread portion and radially inwards to a respective one of the bead portions;

wherein the tread portion comprises at least one radially outer tread cap layer and at least one radially inner electrically conductive tread base layer; and wherein the tire further comprises:

an electrically conductive rubber composition strip having a first strip end, which is i) axially between the first sidewall and an adjacent axially outer surface of the tread base layer, and ii) radially below the tread cap layer, and wherein the electrically conductive rubber composition strip extends from the first strip end along an axially inner side of a first sidewall and between the first and second apex to a respective chafer of the respective one of the bead portions adjacent the first sidewall, wherein the respective chafer is an electrically conductive chafer.

3. The pneumatic tire according to claim 2, wherein the electrically conductive rubber composition strip has a second strip end in contact with a radially outer end region of the electrically conductive chafer.

4. The pneumatic tire according to claim 2, wherein the electrically conductive chafer is one or more of:

extending from a radially innermost tip of the respective bead portion over less than 40% of a total radial height of the tire; and extending from a first position, which is radially and axially inside of the adjacent bead, passing an axially outer side of the bead to a second, radially outer position, which is covered by a radially inner end of the first sidewall.

5. The pneumatic tire according to claim 2, wherein the electrically conductive rubber composition strip has one or more of:

a length extension of over more than 50% of a total radial height of the tire;

a circumferential strip width within a range of 1 mm to 80 mm;

a strip thickness within a range of 1 mm to 4 mm, measured perpendicular to a length and a width of the strip;

an electrical volume resistivity lower than $10^8$ ohm·cm;

a rubber composition comprising one or more of: more than 40 phr carbon black, a carbon black having an iodine absorption of at least 100 g/kg, less than 15 phr of silica; and a rubber composition devoid of one or more of a cord reinforcement, and a fabric reinforcement.

6. The pneumatic tire according to claim 2, wherein a radially outer end of the first sidewall is in contact with an axially outer side of the tread cap layer.

7. The pneumatic tire according to claim 2, wherein the tread portion comprises an electrically conductive circumferential ring portion having an axial thickness of less than 10 mm and extending from the tread base layer to a radially outermost surface of the tread portion.

8. The pneumatic tire according to claim 7, wherein one or more of the electrically conductive rubber composition strip, the electrically conductive tread base layer, the electrically conductive chafer, and the electrically conductive circumferential ring portion have an electrical volume resistivity lower than $10^7$ ohm·cm; and wherein one or more of the tread cap layer, one or more of the sidewalls, and a rubber coating composition of the at least one carcass ply have an electrical volume resistivity higher than $10^{10}$ ohm·cm.

* * * * *